(12) United States Patent
Flyax

(10) Patent No.: US 10,210,037 B2
(45) Date of Patent: Feb. 19, 2019

(54) INTERFACE TOOL FOR ASSET FAULT ANALYSIS

(71) Applicant: Uptake Technologies, Inc., Chicago, IL (US)

(72) Inventor: Alexander V. Flyax, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 164 days.

(21) Appl. No.: 15/247,830

(22) Filed: Aug. 25, 2016

(65) Prior Publication Data

US 2018/0060149 A1    Mar. 1, 2018

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 11/3058* (2013.01)

(58) Field of Classification Search
CPC .............. G06F 11/079; G06F 11/0709; G06F 11/0751; G06F 11/0769
See application file for complete search history.

(56) References Cited

U.S. PATENT DOCUMENTS

| | | | |
|---|---|---|---|
| 5,566,092 A | 10/1996 | Wang et al. | |
| 5,630,755 A | 5/1997 | Walsh et al. | |
| 5,633,800 A | 5/1997 | Bankert et al. | |
| 6,018,300 A | 1/2000 | Dowden et al. | |
| 6,256,594 B1 | 7/2001 | Yamamoto et al. | |
| 6,324,659 B1* | 11/2001 | Pierro | B61L 27/0094 714/47.3 |
| 6,336,065 B1 | 1/2002 | Gibson et al. | |
| 6,338,152 B1* | 1/2002 | Fera | B61L 27/0094 709/207 |
| 6,442,542 B1 | 8/2002 | Ramani et al. | |
| 6,473,659 B1 | 10/2002 | Shah et al. | |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

CAFC, *Electric Power Group, LLC v. Alstom S.A.*, pp. 1-12 (Year: 2016).*

(Continued)

*Primary Examiner* — Marc Duncan
*Assistant Examiner* — Jonathan D Gibson
(74) *Attorney, Agent, or Firm* — Lee Sullivan Shea & Smith LLP

(57) ABSTRACT

Disclosed herein are systems, devices, and methods related to analyzing faults across a population of assets. In particular, examples involve receiving a selection of variables each corresponding to an asset attribute type, accessing data associated with the selected variables, determining the number of fault occurrences across the population of assets for each combination of values of the selected variables, and facilitating the identification of outlier combination(s) that correspond to an abnormally large number of fault occurrences relative to other combination(s).

20 Claims, 19 Drawing Sheets

(56) References Cited

U.S. PATENT DOCUMENTS

| | | | |
|---|---|---|---|
| 6,622,264 B1 * | 9/2003 | Bliley | G06F 11/2257 714/26 |
| 6,631,384 B1 | 10/2003 | Richman et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,051,044 B1 * | 5/2006 | Fera | B61L 27/0094 |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,218,974 B2 * | 5/2007 | Rumi | G05B 13/0275 318/561 |
| 7,233,886 B2 | 6/2007 | Wegerich et al. | |
| 7,246,039 B2 * | 7/2007 | Moorhouse | H04L 41/06 702/185 |
| 7,257,744 B2 * | 8/2007 | Sabet | H04L 41/00 709/224 |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,451,003 B2 * | 11/2008 | Chester | G05B 23/0254 700/28 |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,567,844 B2 * | 7/2009 | Thomas | G05B 15/02 348/143 |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,826,943 B2 * | 11/2010 | Yu | G05B 23/0232 701/31.2 |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 9,400,867 B2 * | 7/2016 | Boyd | G06F 11/3013 |
| 2002/0007225 A1 * | 1/2002 | Costello | B61K 13/00 700/99 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2003/0208706 A1 * | 11/2003 | Roddy | H04L 1/22 714/48 |
| 2004/0181712 A1 | 9/2004 | Taniguchi et al. | |
| 2004/0243636 A1 | 12/2004 | Hasiewicz et al. | |
| 2005/0119905 A1 | 6/2005 | Wong et al. | |
| 2005/0171661 A1 * | 8/2005 | Abdel-Malek | B61L 27/0094 701/31.4 |
| 2005/0192678 A1 * | 9/2005 | May | G06F 11/0742 700/9 |
| 2005/0222747 A1 | 10/2005 | Vhora et al. | |
| 2007/0208434 A1 * | 9/2007 | Yeh | G05B 23/0264 700/9 |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2008/0243328 A1 * | 10/2008 | Yu | G05B 23/0232 701/31.2 |
| 2010/0114810 A1 * | 5/2010 | Hoyte | G05B 23/0294 706/47 |
| 2010/0128600 A1 * | 5/2010 | Srinivasmurthy | H04L 41/0663 370/221 |
| 2011/0178977 A1 * | 7/2011 | Drees | G05B 15/02 706/52 |
| 2012/0130759 A1 | 5/2012 | Davenport et al. | |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0232094 A1 | 9/2013 | Anderson et al. | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0074409 A1 * | 3/2014 | Boyd | G06F 11/3013 702/35 |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |
| 2015/0046870 A1 | 2/2015 | Goldenberg et al. | |

(56) References Cited

U.S. PATENT DOCUMENTS

| | | | |
|---|---|---|---|
| 2015/0262060 A1 | 9/2015 | Husain et al. | |
| 2016/0189440 A1* | 6/2016 | Cattone | G07C 5/008 701/31.5 |
| 2016/0189447 A1* | 6/2016 | Valenzuela | G07C 5/0808 701/29.6 |
| 2017/0052536 A1* | 2/2017 | Warner | G06Q 10/06312 |
| 2017/0263060 A1* | 9/2017 | Sukumaran | G07C 5/0808 |

FOREIGN PATENT DOCUMENTS

| | | |
|---|---|---|
| WO | 2014145977 | 9/2014 |
| WO | 2014205497 | 12/2014 |

OTHER PUBLICATIONS

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Inforcom (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

"Enterprise Optimization" Johnson Controls, Inc. 2015, 32 pages.

Huston et al. "Assessing the role of electricity networks in bushfire ignitions: estimation of current and prospective performance." 21st International Congress of Modelling and Simulation, Gold Cost, Australia, Nov. 29 to Dec. 4, 2015, pp. 1510-1516.

"Multilin Intelligent Line Monitoring System." General Electric Company, 2015, 1 page.

* cited by examiner

| raw reduced data | summary table | summary with significance test | pivot table | categorical plot | density plot | map of faults | | |
|---|---|---|---|---|---|---|---|---|
| calculate | | | | | | | | |
| Show 10 entries | | | | | | search: | | |
| model | thrPos | assetId | | num_faults | days_normalize | faults_normalized |
| All | All | All | | All | All | All |
| model #1 | Idle | asset #1 | | 9 | 182 | 0.04945055 |
| model #1 | T5 | asset #2 | | 3 | 182 | 0.01648352 |
| model #1 | T8 | asset #3 | | 2 | 182 | 0.01898901 |
| model #1 | T7 | asset #3 | | 3 | 182 | 0.01648352 |
| model #1 | T3 | asset #3 | | 3 | 182 | 0.01648352 |
| model #1 | T5 | asset #3 | | 3 | 182 | 0.01648352 |
| model #1 | Idle | asset #3 | | 20 | 182 | 0.10989011 |
| model #1 | T6 | asset #3 | | 3 | 182 | 0.01648352 |
| model #1 | Idle | asset #4 | | 7 | 182 | 0.03846154 |
| model #1 | T2 | asset #4 | | 2 | 182 | 0.01898901 |
| Showing 1 to 10 of 2,104 entries | | | | Previous 1 2 3 4 5 … 211 Next | | |

FIG. 10

| model | thrPos | raw_counts | raw_days | faults_asset_normalized | faults_asset_normalized_median | std_err | mult_coeff | num_assets | p_value |
|---|---|---|---|---|---|---|---|---|---|
| All | All | All | All | All | All | All | All | All | All |
| model #1 | T 8 | 232317 | 2369762 | 35.7892 | 23.379420 | .9709650 | 10.156567 | 1966 | 1.000047e-10 |
| model #2 | T 8 | 1153 | 19717 | 21.34427 | 14.105007 | 5.6853316 | 6.058325 | 26 | 7.314046e-10 |
| model #3 | T 8 | 40760 | 507105 | 29.33791 | 24.261128 | 1.3973881 | 8.327226 | 349 | 1.016679e-10 |
| model #4 | T 8 | 2800 | 98320 | 10.39463 | 10.087772 | .6437942 | 2.950395 | 70 | 2.240872e-10 |
| model #5 | T 8 | 1111 | 1594 | 254.40088 | 98.764706 | 78.8939782 | 72.20848 | 9 | 1.000000e-10 |
| model #6 | T 8 | 13498 | 47929 | 102.79309 | 40.238452 | 57.8939782 | 29.176634 | 64 | 1.000000e-10 |
| model #7 | T 8 | 11122 | 273514 | 14.84213 | 9.921316 | 1.1699211 | 4.212767 | 219 | 3.690512e-06 |
| model #8 | T 8 | 1281 | 40272 | 11.61018 | 6.016484 | 1.8440634 | 3.295414 | 65 | 4.751609e-03 |
| model #9 | T 8 | 4121 | 30969 | 48.57002 | 29.571244 | 5.5432548 | 13.786039 | 50 | 1.000892e-10 |
| model #10 | T 8 | 3200 | 33455 | 34.91257 | 24.341107 | 5.1773486 | 9.909530 | 68 | 4.285219e-10 |

FIG. 11

| | raw reduced data | summary table | summary with significance test | pivot table | categorical plot | bar chart | density plot | map of faults |
|---|---|---|---|---|---|---|---|---| calculate
show [10▼] entries                                                                                              search: [____]

| | thrPos ⇕ | Model #1 ⇕ | Model #2 ⇕ | Model #3 ⇕ | Model #4 ⇕ | Model #5 ⇕ | Model #6 ⇕ |
|---|---|---|---|---|---|---|---|
| 18 | T 8 | 35.78292 | 21.34427 | 29.33791 | 10.39463 | 254.40088 | 102.79309 |
| 17 | T 7 | 41.25307 | 0.6816223 | 4.3230101 | 6.86739 | 2.162844 | 1.9683470 |
| 16 | T 6 | 13.58140 | 2.1376722 | 8.4917670 | 14.797297 | 3.733061 | 2.0615923 |
| 15 | T 5 | 27.62615 | 2.8506964 | 11.6904578 | 10.138889 | 3.360900 | 3.2244834 |
| 14 | T 4 | 28.46330 | 4.7269653 | 15.3803390 | 23.822844 | 5.186715 | 3.6518569 |
| 13 | T 3 | 30.97477 | 4.2000742 | 19.6141291 | 24.333333 | 5.638398 | 2.1925387 |
| 12 | T 2 | 16.12791 | 5.2237482 | 29.3586427 | 28.781362 | 7.592317 | 2.5844866 |
| 11 | T 1 | 114.59302 | 6.3678545 | 37.2077378 | 65.315789 | 10.342523 | 20.2898014 |
| 10 | Stop | 11.03488 | 1.5204570 | 0.7524279 | 6.886792 | 1.759036 | 0.6732543 |
| 9 | Idle | 5050.56193 | 87.7499381 | 75.3334744 | 77.4242422 | 38.235777 | 114.5698699 |

Showing 1 to 10 of 18 entries                                                               Previous [1] 2 Next
p-value:
[0.005]   [0.05]   [0.1]
0.005 0.015 0.025 0.035 0.045 0.055 0.065 0.075 0.085 0.095

FIG. 12

INTERFACE TOOL FOR ASSET FAULT ANALYSIS

BACKGROUND

Today, machines (also referred to herein as "assets") are ubiquitous in many industries. From locomotives that transfer cargo across countries to farming equipment that harvest crops, assets play an important role in everyday life.

Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

OVERVIEW

An organization that is interested in monitoring and analyzing assets in operation may deploy an asset data platform that is configured to receive and analyze data related to the attributes of the assets. This asset attribute data may take various forms and originate from various sources. As one example, the asset attribute data may include data related to the operation of an asset, such as signal data, fault data, location data, etc., collected by the asset itself or externally-collected data such as weather data, "hotbox" data, etc. As another example, the asset attribute data may include data related to the configuration of the asset, such as data indicating the asset's brand, make, model, age, software version, etc. Asset attribute data may take other forms as well.

As assets become increasingly equipped with mechanisms that enable the assets to collect and transmit asset data, data-analysis platforms are beginning to receive large volumes of asset attribute data, which may create numerous challenges for analyzing and presenting fault data in the context of other asset data. Moreover, current systems for analyzing asset data tend to do so on an asset-to-asset basis and do not provide the ability to identify particular asset attributes leading to fault occurrences across a plurality of assets.

Disclosed herein are systems, devices, and methods for improving the technology related to analyzing fault occurrences across a population of assets. In accordance with example embodiments, an asset data platform may be configured to receive data related to the operation of a population of assets, ingest and process the received data, and then facilitate providing a tool to enable a user to perform an analysis of fault occurrences across the population of assets, including an analysis of how fault occurrences are being impacted by different asset attributes.

One example tool may take the form of an interactive data analysis tool that may utilized to analyze fault occurrences for different combinations of asset attributes and their possible values. Such an interactive analysis tool may be provided by an asset data platform and may include a user interface running on a client station via a web application, a native application, or the like. However, the interactive data analysis tool may take other forms as well.

To support the interactive data analysis tool, the asset data platform may be configured to maintain asset attribute data that corresponds to fault occurrences across a population of assets. For instance, the asset data platform may store, for each fault occurrence at an asset in the population, data related to the asset's attributes (e.g., the asset's operation and/or configuration) around the time of the fault occurrence. The asset data platform may then be configured to utilize the maintained asset attribute data to facilitate an analysis of fault occurrences for different combinations of asset attributes and their possible values.

In practice, a user may begin using the interactive analysis tool by accessing the user interface at the user's client station (e.g., via a web application or a native application). In turn, the user may input to the interactive analysis tool, via the user interface, a selection of two or more variables to use for the analysis of fault occurrences. According to an embodiment, each variable may comprise a given type of asset attribute with a range of possible values that may have a different impact on fault occurrences. Representative examples of such asset attributes may include model number, throttle position, software version, fault code type, asset age, and external temperature. For example, "model number" is an asset attribute with a range of possible values, such as Model #1, Model #2, etc., and selections of these values could have differing impacts on the aggregated fault occurrence counts. As another example, "throttle position" is an asset attribute with a range of possible values, such as Idle, T 1, T 2, etc., and these values could have differing impacts on the aggregated fault occurrence counts.

Depending on the type of asset attribute being selected, the range of possible values may also take various forms. For instance, the range of possible values for certain asset attributes may be categorical, meaning the set of values is composed of a finite number of discrete values. Representative examples of attributes that have categorical values may include model number, throttle position, fault code, etc. Alternatively, the range of possible values for certain other asset attributes may be continuous, meaning its values may correspond to any number within the range. Representative examples of variables that have continuous values may include asset speed, temperature, etc. The selected attributes and their possible values may take various other forms as well.

After the user inputs the selection of the two or more asset attributes via the user interface, the asset data platform may receive data indicative of the user's selection. As one aspect of the interactive data analysis tool, the asset data platform may then retrieve data reflecting the respective value of each selected asset attribute at the time of each fault occurrence across the population of assets. (For purposes of this disclosure, "at the time" of a fault occurrence may refer to the specific time of fault occurrence as well as times shortly before and/or shortly after the specific time of the fault occurrence). For example, if the selected asset attributes are model number and throttle position, the asset data platform may retrieve data reflecting the value of the model number and the value of throttle position corresponding to each fault occurrence across the population of assets (e.g., model #1/Idle for first fault occurrence, model #1/T 4 for second fault occurrence, etc.).

As another aspect of the interactive data analysis tool, the asset data platform may be configured to generate data reflecting the respective count of fault occurrences that correspond to each combination of the selected attributes' values. For example, if the selected asset attributes are model number and throttle position, the asset data platform may generate data reflecting the respective number of fault occurrences that correspond to each of model #1/Idle, model #1/T 1, model #2/Idle, model #2/T 1, and so on.

The data reflecting the respective count of fault occurrences that correspond to each combination of the selected attributes' values may take various forms. As one example, the number the fault occurrences that correspond to each attribute value combination may be determined for each individual asset in the population. In other words, the asset data platform may look at the fault occurrence data on an asset-by-asset basis to determine, for each individual asset in the population, the number of fault occurrences at the asset that correspond to each combination of the selected attributes' values. This per-asset data may be represented as the "raw" number of fault occurrences for each attribute value combination, and/or may be represented as a "normalized" number of fault occurrences for each attribute value combination that is adjusted based on a given unit of time related to the particular asset (e.g., the number of days that the asset has been in operation and/or has had a particular configuration).

As another example, the data reflecting the number the fault occurrences that correspond to each combination of the selected attributes' values may be generated for the asset population as a whole. In other words, the asset data platform may aggregate the per-asset fault occurrence counts for each attribute value combination, thus resulting in an aggregated number the fault occurrences across the asset population for each combination of the selected attributes' values. As with the per-asset data, this aggregated data may be represented as the "raw" number of fault occurrences across the asset population for each attribute value combination, and/or may be represented as a "normalized" number of fault occurrences across the asset population for each attribute value combination that is adjusted based on a unit of time related to the asset population as a whole (e.g., the aggregated number of days that the assets in the population have been in operation and/or have had a particular configuration).

As yet another aspect of the interactive data analysis tool, the asset data platform may be configured to identify one or more "outlier" fault counts in faults binned by combinations of selected attributes' values relative to the counts in the entire population of interest. For example, using the "normalized" number of fault occurrences across the asset population for each attribute value combination, the asset data platform may determine how significantly different (reflected via a p-value) the fault count of a particular combination of values from the fault counts in the rest of the population. As another example, using the "normalized" number of fault occurrences across the asset population for each attribute value combination, the asset data platform may determine a multiplicative coefficient for each combination of selected attributes' values, which may reflect how many more faults, multiplicatively, a given combination is likely to get than the average. (E.g., if model A/throttle 8 combination has a multiplicative coefficient of 9, it means belonging to that group is likely to produce fault count on average 9 times that of the average fault count for the population.) Thus, these metrics may reflect the degree to which each given combination of selected attributes' values is an "outlier" relative to the other combinations of selected attributes' values.

In still another aspect of the interactive data analysis tool, the asset data platform may be configured to present various types of data regarding fault occurrences back to the user via the user interface. For instance, the asset data platform may present the user with data reflecting the number of fault occurrences that correspond to each combination of the selected attributes' values (on a per-asset basis and/or for the asset population as a whole) as well as an indication of whether any one or more combinations of the selected attributes' values are outliers. Further, the asset data platform may present the data regarding fault occurrences in various different interfaces views, examples of which may include a raw data view, one or more summary table views, a pivot table view, a categorical plot view, a bar chart view, a density plot view, and a map of faults view.

This interactive analysis tool may thus help to overcome the aforementioned problems involved with existing technology.

As discussed above, the examples provided herein are related to analyzing fault occurrences across a population of assets. In one aspect, a computing system is provided. The computing system comprises at least a network interface configured to facilitate communications over a communication network with one or more asset-related sources and one or more client stations, at least one processor, a non-transitory computer-readable medium, and program instructions stored on the non-transitory computer-readable medium. The program instructions are executable by the at least one processor to cause the computing system to: (a) receive, via the network interface from a client station configured with a user interface for use in analyzing fault occurrences across a population of assets, data indicating a selection of at least two variables that each comprise a respective type of asset attribute having a range of possible values (b) access data reflecting the respective values of the two or more selected variables at the time of each fault occurrence for the population of assets, (c) based on the accessed data, determine a respective number of fault occurrences aggregated across the population of assets for each combination of values of the selected two or more variables, (d) identify at least one outlier combination of values of the selected two or more variables that corresponds to an abnormally large number of fault occurrences relative to the other combinations of values of the selected two or more variables, and (e) transmit, via the network interface to the client station, data that causes the client station to present via the user interface (i) an indication of the respective number of fault occurrences aggregated across the population of assets for each combination of values of the selected two or more variables and (ii) an indication of the identified at least one outlier combination of values of the selected two or more variables.

In another aspect, a non-transitory computer-readable medium is provided having instructions stored thereon that are executable to cause a computing system to: (a) receive, via the network interface from a client station configured with a user interface for use in analyzing fault occurrences across a population of assets, data indicating a selection of at least two variables that each comprise a respective type of asset attribute having a range of possible values, (b) access data reflecting the respective values of the two or more selected variables at the time of each fault occurrence for the population of assets, (c) based on the accessed data, determine a respective number of fault occurrences aggregated across the population of assets for each combination of values of the selected two or more variables, (d) identify at least one outlier combination of values of the selected two or more variables that corresponds to an abnormally large number of fault occurrences relative to the other combinations of values of the selected two or more variables, and (e) transmit, via the network interface to the client station, data that causes the client station to present via the user interface (i) an indication of the respective number of fault occurrences aggregated across the population of assets for each combination of values of the selected two or more variables and (ii) an indication of the identified at least one outlier combination of values of the selected two or more variables.

In yet another aspect, a computer implemented method is provided. The method comprises (a) receiving, via the network interface from a client station configured with a user interface for use in analyzing fault occurrences across a population of assets, data indicating a selection of at least two variables that each comprise a respective type of asset attribute having a range of possible values, (b) accessing data reflecting the respective values of the two or more selected variables at the time of each fault occurrence for the population of assets, (c) based on the accessed data, determining a respective number of fault occurrences aggregated across the population of assets for each combination of values of the selected two or more variables, (d) identifying at least one outlier combination of values of the selected two or more variables that corresponds to an abnormally large number of fault occurrences relative to the other combinations of values of the selected two or more variables, and (e) transmitting, via the network interface to the client station, data that causes the client station to present via the user interface (i) an indication of the respective number of fault occurrences aggregated across the population of assets for each combination of values of the selected two or more variables and (ii) an indication of the identified at least one outlier combination of values of the selected two or more variables.

One of ordinary skill in the art will appreciate these as well as numerous other aspects in reading the following disclosure.

BRIEF DESCRIPTION OF THE DRAWINGS

FIG. 10 is an example graphical interface displaying a summary table view.

FIG. 11 is an example graphical interface displaying a summary table with significance test view.

FIG. 12 is an example graphical interface displaying a pivot table view.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
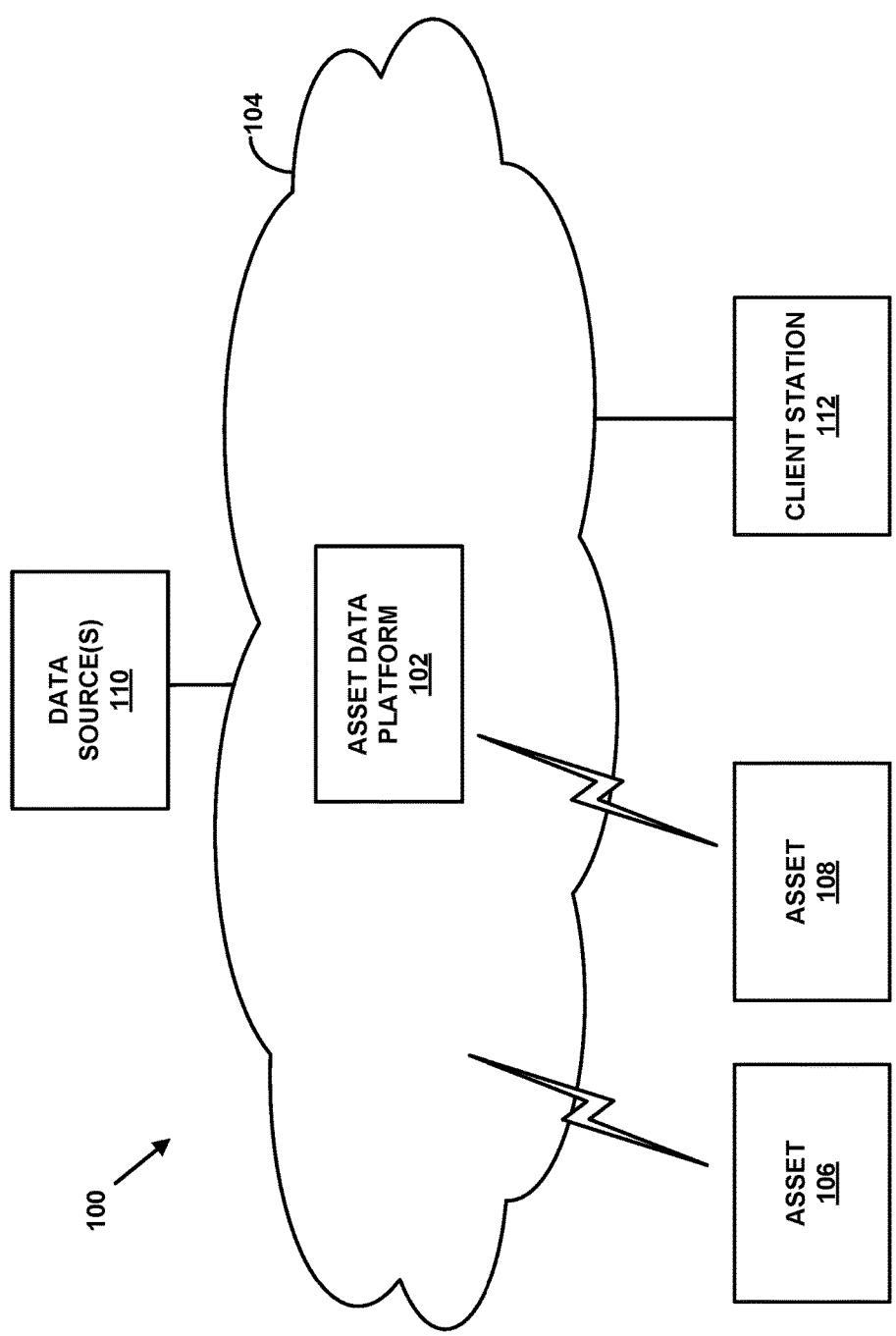
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset-related data, via the communication network 104, that is sent by one or more assets and/or data sources. As another example, the asset data platform 102 may transmit asset-related data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like.

Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
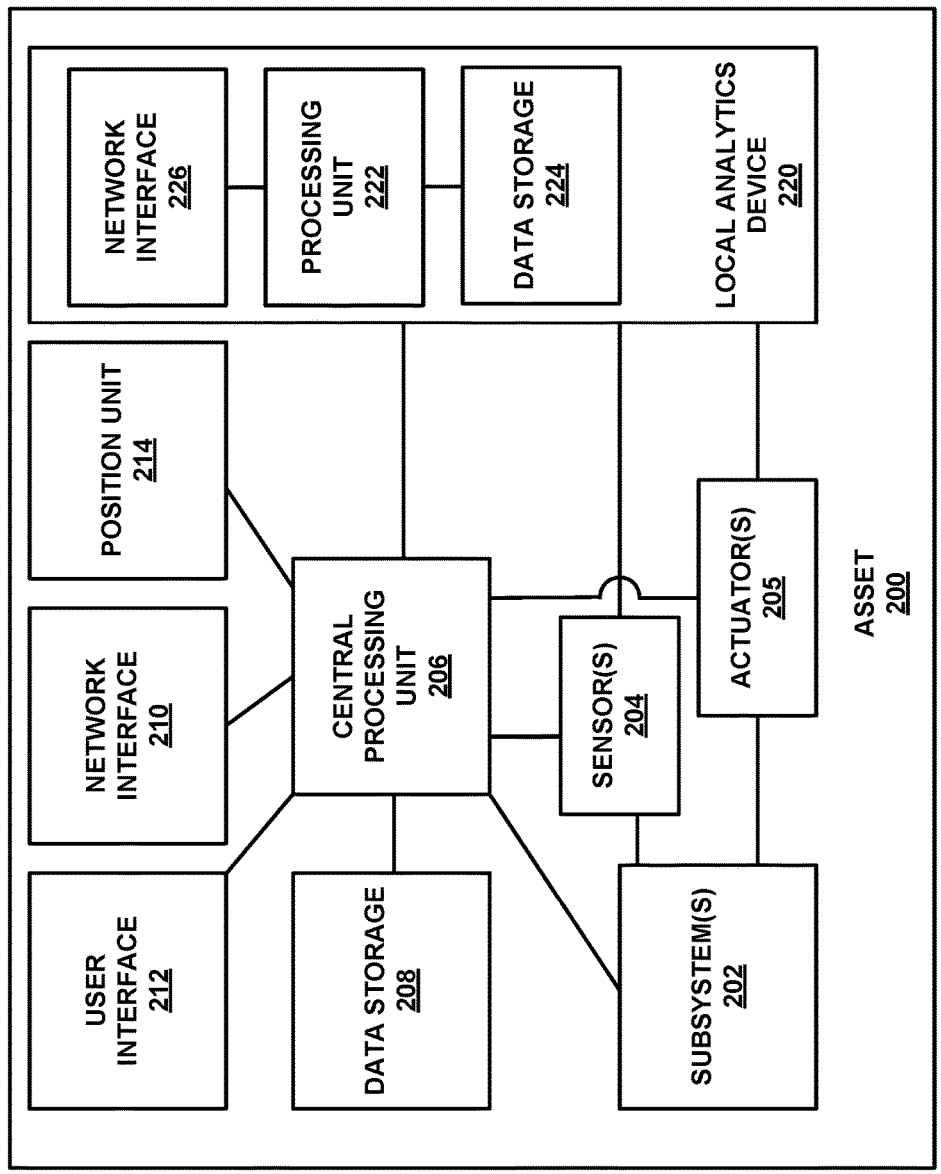
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
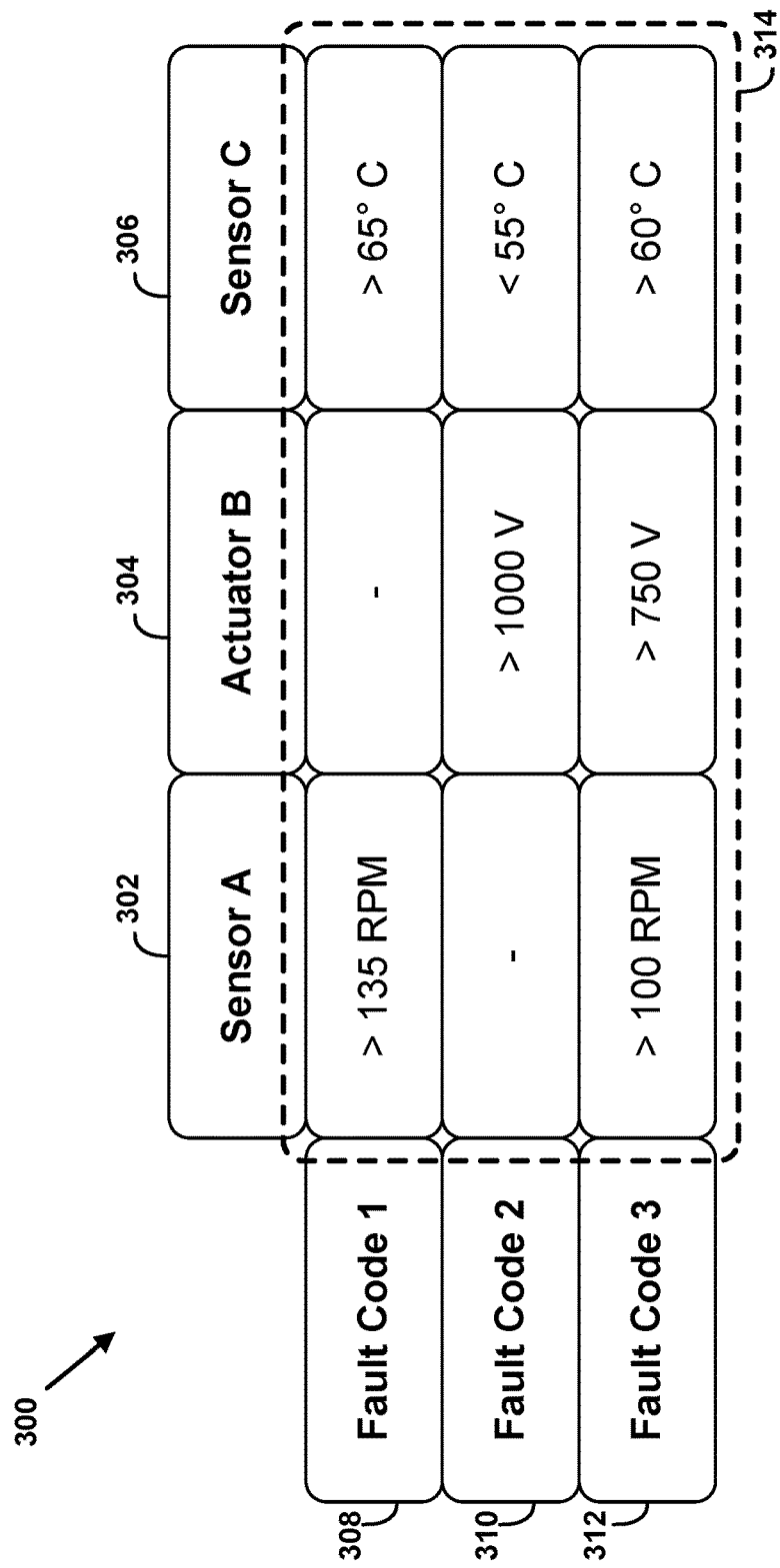
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
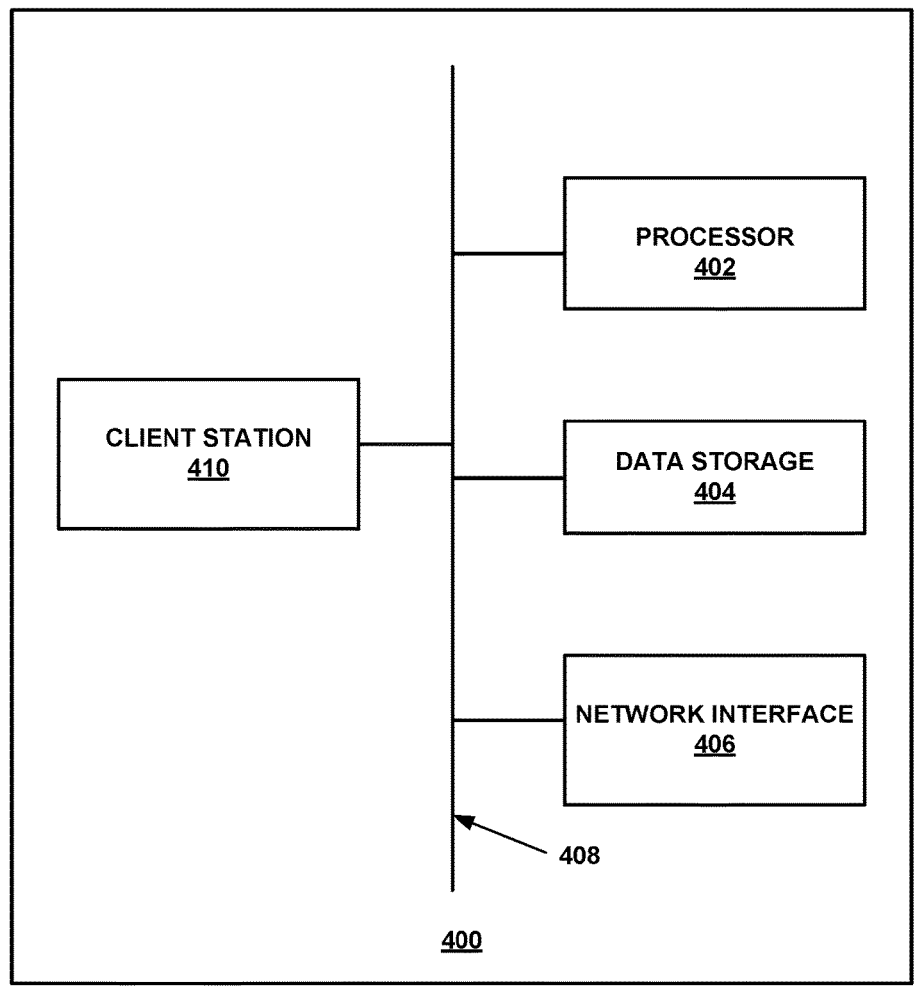
FIG. 4 depicts a structural diagram of an example platform.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
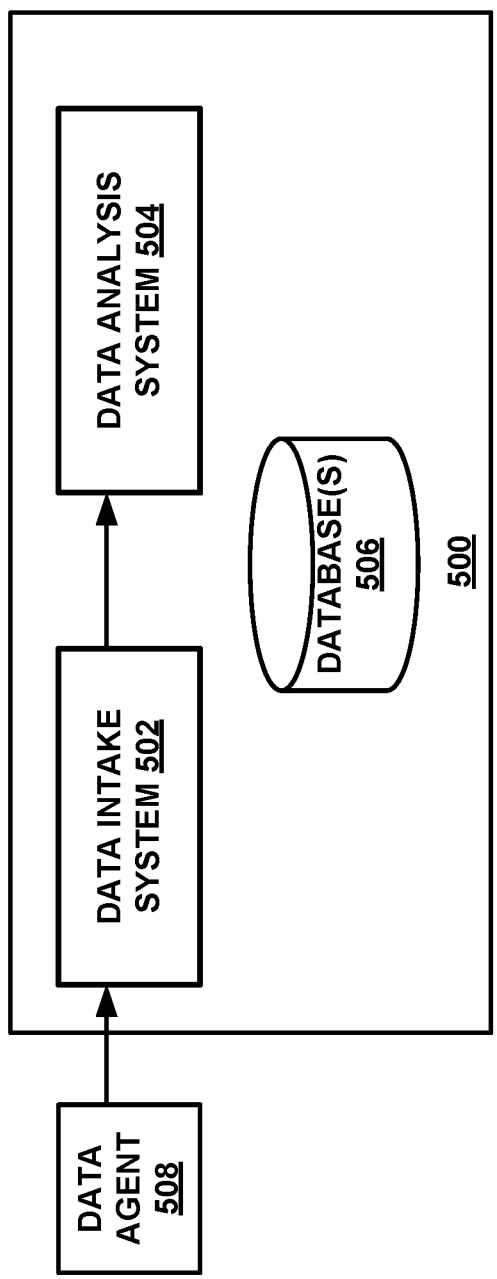
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw or aggregated data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source, such as the asset 106, provides data to the asset data platform 102 that then performs one or more functions. It should be understood that this is done merely for sake of clarity and explanation and is not meant to be limiting. In practice, the asset data platform 102 generally receives data from multiple sources, perhaps simultaneously, and performs operations based on such aggregate received data.

A. Collection of Operating Data

As mentioned above, each of the representative assets 106 and 108 may take various forms and may be configured to perform a number of operations. In a non-limiting example, the asset 106 may take the form of a locomotive that is operable to transfer cargo across the United States. While in transit, the sensors and/or actuators of the asset 106 may obtain data that reflects one or more operating conditions of the asset 106. The sensors and/or actuators may transmit the data to a processing unit of the asset 106.

The processing unit may be configured to receive the data from the sensors and/or actuators. In practice, the processing unit may receive signal data from multiple sensors and/or multiple actuators simultaneously or sequentially. As discussed above, while receiving this data, the processing unit may also be configured to determine whether the data satisfies triggering criteria that trigger any abnormal-condition indicators, otherwise referred to as a fault, such as fault codes, which is fault data that serves as an indication that an abnormal condition has occurred within the asset. In the event the processing unit determines that one or more abnormal-condition indicators are triggered, the processing unit may be configured to perform one or more local operations, such as outputting an indication of the triggered indicator via a user interface.

The asset 106 may then transmit asset attribute data (e.g., asset operating data and/or asset configuration data) to the asset data platform 102 via a network interface of the asset 106 and the communication network 104. In operation, the asset 106 may transmit asset attribute data to the asset data platform 102 continuously, periodically, and/or in response to triggering events (e.g., abnormal conditions). Specifically, the asset 106 may transmit asset attribute data periodically based on a particular frequency (e.g., daily, hourly, every fifteen minutes, once per minute, once per second, etc.), or the asset 106 may be configured to transmit a continuous, real-time feed of operating data. Additionally or alternatively, the asset 106 may be configured to transmit asset attribute data based on certain triggers, such as when sensor and/or actuator measurements satisfy triggering criteria for any abnormal-condition indicators. The asset 106 may transmit asset attribute data in other manners as well.

In practice, asset attribute data for the asset 106 may include signal data (e.g., sensor and/or actuator data), asset attribute data, fault data, and/or other asset event data (e.g., data indicating asset shutdowns, restarts, diagnostic operations, fluid inspections, repairs etc.). In some implementations, the asset 106 may be configured to provide the data in a single data stream, while in other implementations the asset 106 may be configured to provide the operating data in multiple, distinct data streams. For example, the asset 106 may provide to the asset data platform 102 a first data stream of signal data and a second data stream of fault data. As another example, the asset 106 may provide to the asset data platform 102 a separate data stream for each respective sensor and/or actuator on the asset 106. Other possibilities also exist.

Signal data may take various forms. For example, at times, sensor data (or actuator data) may include measurements obtained by each of the sensors (or actuators) of the asset 106. While at other times, sensor data (or actuator data) may include measurements obtained by a subset of the sensors (or actuators) of the asset 106.

Specifically, the signal data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 106 may include particular sensor data in the operating data based on a fault-code rule or instruction provided by the analytics system 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which a fault is detected.

In particular, based on the time at which a fault is detected, the data may include one or more respective sensor and/or actuator measurements from each sensor and/or actuator of interest (e.g., sensors and/or actuators directly and indirectly associated with the detected fault). The one or more measurements may be based on a particular number of measurements or particular duration of time around the time of the detected fault.

For example, if the asset detects a fault that triggers Fault Code 2 from FIG. 3, the sensors and actuators of interest might include Actuator B and Sensor C. The one or more measurements may include the respective set measurements obtained by Actuator B and Sensor C at the time the fault was detected, shortly before the time of the fault detection, shortly after the time of the fault detection, and/or some combination thereof.

Similar to signal data, the fault data may take various forms. In general, the fault data may include or take the form of an indicator that is operable to uniquely identify the particular type of fault that occurred at the asset 106 from all other types of faults that may occur at the asset 106. This indicator, which may be referred to as a fault code, may take the form of an alphabetic, numeric, or alphanumeric identifier, or may take the form of a string of words that is descriptive of the fault type, such as "Overheated Engine" or "Out of Fuel," among other examples. Additionally, the fault data may include other information regarding the fault occurrence, including indications of when the fault occurred (e.g., a timestamp) and where the fault occurred (e.g., GPS data), among other examples. Data relating to other types of events (e.g., maintenance events) may take a similar form.

Moreover, the asset configuration data may take a variety of forms as well. Generally, the asset configuration data pertains to information "about" an asset. In one instance, asset configuration data may include data asset identification information, such as model number, model year (e.g., asset age), etc. Whereas, in another instance, the asset data directly relate to a particular past and/or present configuration of the asset. For example, the asset attribute information may indicate which software versions are installed and/or running on the asset, after market modifications made to an asset, among other possibilities.

In one particular embodiment, the asset 106 may send data to asset data platform 102 in the form of "data packs" that each correspond to the occurrence of a given fault (or perhaps some other event) at the asset. Each such data pack may include an indicator of the given fault (e.g., a fault code) as well as signal data related to the fault occurrence that was captured at or near the time of the fault (e.g., the 5 relevant signal measurements taken right before the time of the fault detection and the relevant signal measurements at the time the fault was detected).

The asset data platform 102, and in particular, the data intake system of the asset data platform 102, may be configured to receive asset attribute data from one or more assets and/or data sources. The data intake system may be configured to intake at least a portion of the received data, perform one or more operations to the received data, and then relay the data to the data analysis system of the asset data platform 102. In turn, the data analysis system may analyze the received data and based on such analysis, perform one or more operations.

B. Providing Interactive Analysis Tool

As mentioned above, the asset data platform 102 may be configured to receive data related to a population of assets, ingest and process the received data, and then facilitate providing a tool to enable a user to perform an analysis of fault occurrences across the population of assets, including an analysis of how fault occurrences are being impacted by different asset attributes. Generally, the tool may include a user interface running on a client station via a web application, a native application, or the like.

Figure 6:
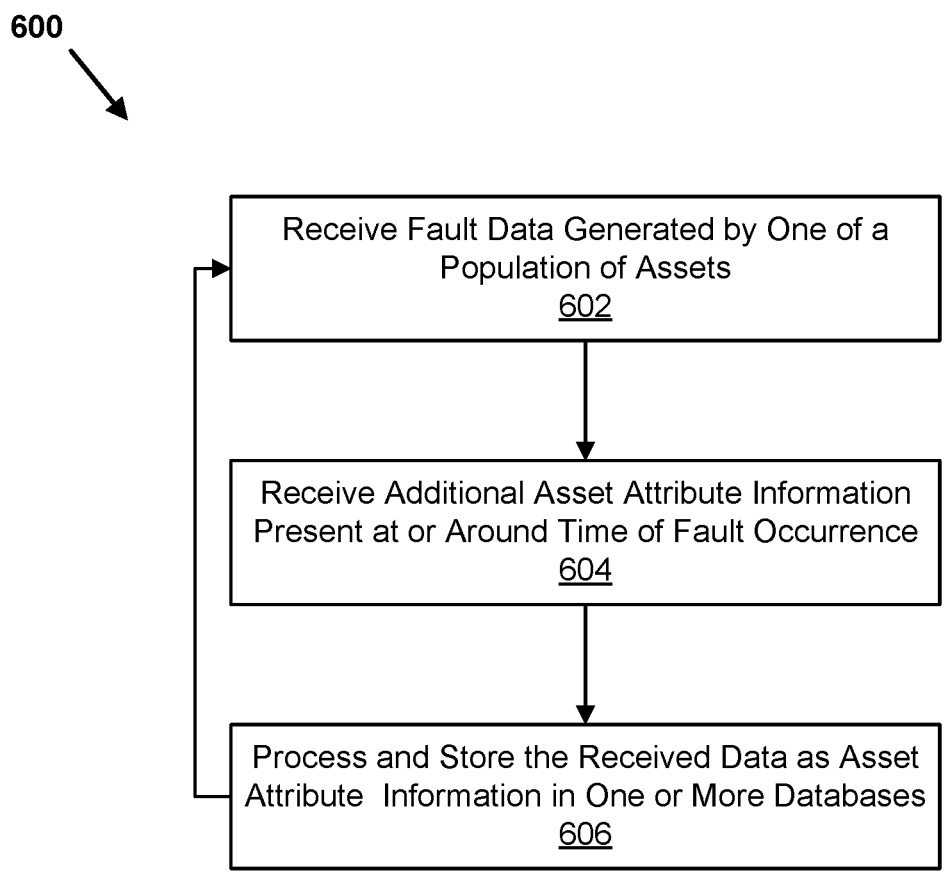
FIG. 6 is an example flow diagram that depicts an example method for receiving and storing asset attribute data based on an asset fault occurrence.
Figure 7:
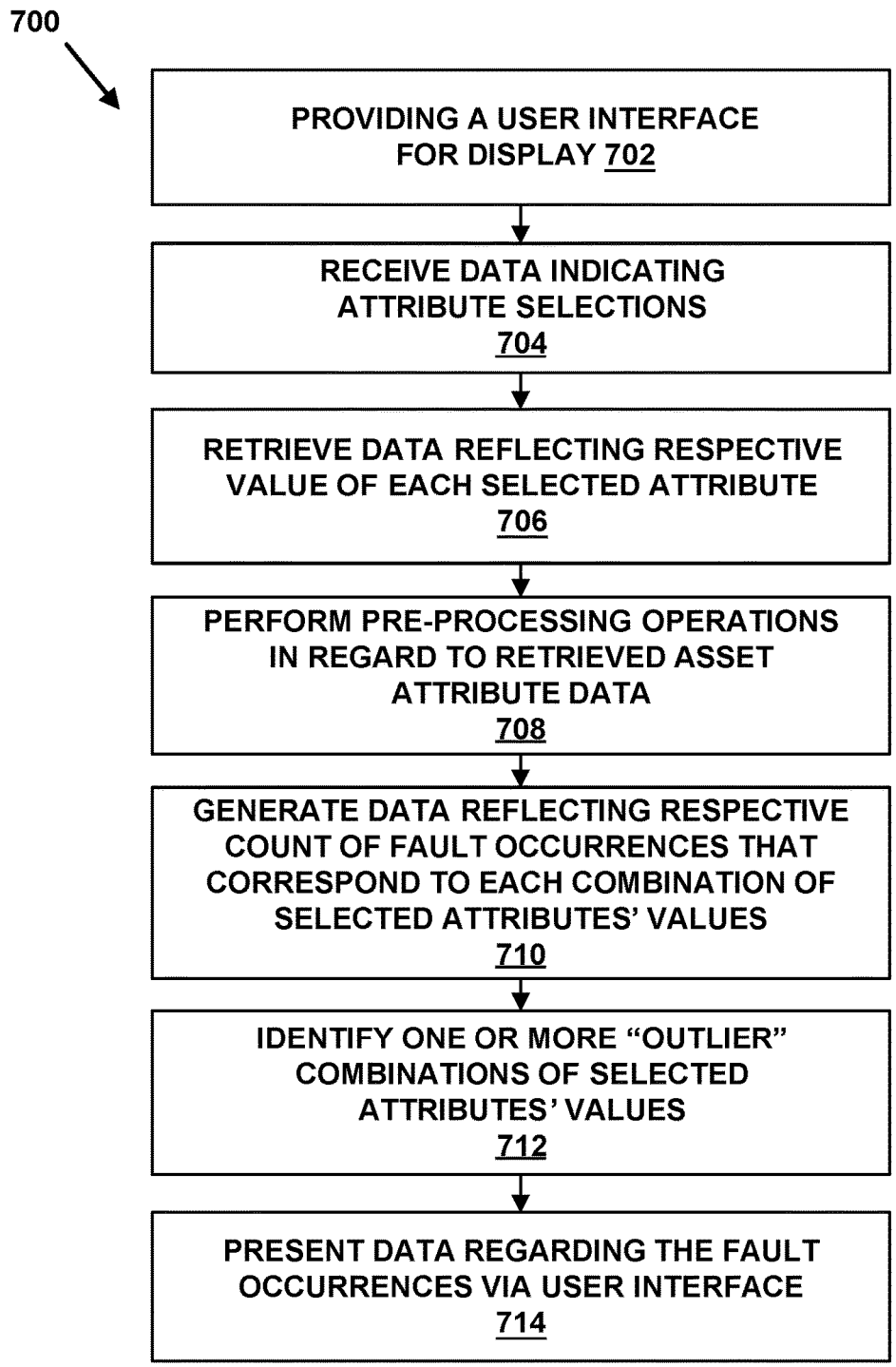
FIG. 7 is an example flow diagram that depicts analyzing fault occurrences across the population of assets, including an analysis of how fault occurrences are being impacted by different asset attributes.

FIGS. 6-7 depict example methods 600 and 700, respectively, that generally involve operations for facilitating the performance of an analysis of fault occurrences across the population of assets. For the purposes of illustration, the example methods 600 and 700 are described as being carried out by asset data platform 102, but these example methods may be carried out by other devices/or systems. One of ordinary skill in the art will also appreciate that flow diagrams 600 and 700 are provided for sake of clarity and explanation and that numerous other combinations of operations may be utilized to facilitate the performance of an analysis of fault occurrences across the population of assets.

FIG. 6 is an example flow diagram that depicts one possible example method 600 for receiving and storing asset attribute data based on an asset fault occurrence. At block 602, the asset data platform 102 may receive fault data indicating the occurrence of a given fault at an individual asset belonging to a population of assets. Generally, a given population of assets may contain two or more assets that share at least one form of commonality. For example, a population of assets may be made up of assets associated with a particular organization (e.g., a particular owner, dealer, manufacture, etc.), assets of a similar type (locomotive, airplane, etc.), assets operating within a certain geographic area and/or worksite, and/or assets considered to be part of the same fleet, among various other possibilities. As discussed above, a given asset may generate fault data, such as a fault code, that indicates that a fault has occurred. In turn, the given asset may transmit the fault data, via communication network 104, which may be received, at block 602, by the asset data platform 102.

In addition, at block 604, the asset data platform 102 may receive other asset attribute data that relates to the given fault occurrence at the asset. For example, the asset data platform 102 may additionally receive signal data (e.g., sensor and/or actuator data) that was captured at or around the time of the fault occurrence. As another example, the asset data platform 102 may additionally receive configuration data that indicates the asset's configuration at or around the time of the fault occurrence. Other examples of asset attribute information related to the fault occurrence may be received as well.

The asset data platform 102 may receive this other asset attribute data that relates to the fault occurrence in various manners. In one instance, the asset data platform 102 may receive the fault data and the other related asset attribute data together in a single transmission, such as data pack or the like. In another instance, the asset data platform 102 may receive the other related asset attribute data separately from the fault data. For example, as described above, an asset may transmit fault data, signal data, and/or configuration data as separate data streams. In this instance, the asset data platform 102 may use data included in these separate streams (e.g., timestamp data) to correlate the fault data indicating the given fault occurrence with the other related asset attribute data. The other asset attribute data may be received by the asset data platform 102 in numerous other ways as well.

At block 606, the asset data platform 102 may process and store the received fault data (e.g., the fault code) and the other related asset attribute data (e.g., signal data and/or configuration data) for the given fault occurrence in one or more of the databases 506. As indicated, the asset data platform 102 may then repeat method 600 each time it receives fault data from an asset in the population. As a result, the asset data platform 102 may build a database of asset attribute data that corresponds to fault occurrences across a population of assets. The asset data platform 102 may then be configured to utilize the maintained asset attribute data to facilitate an analysis of fault occurrences for different combinations of asset attributes and their possible values, as will now be described in further detail.

FIG. 7 is an example flow diagram that depicts one possible example method 700 for analyzing fault occurrences across the population of assets, including an analysis of how fault occurrences are being impacted by different asset attributes.

Figure 8:
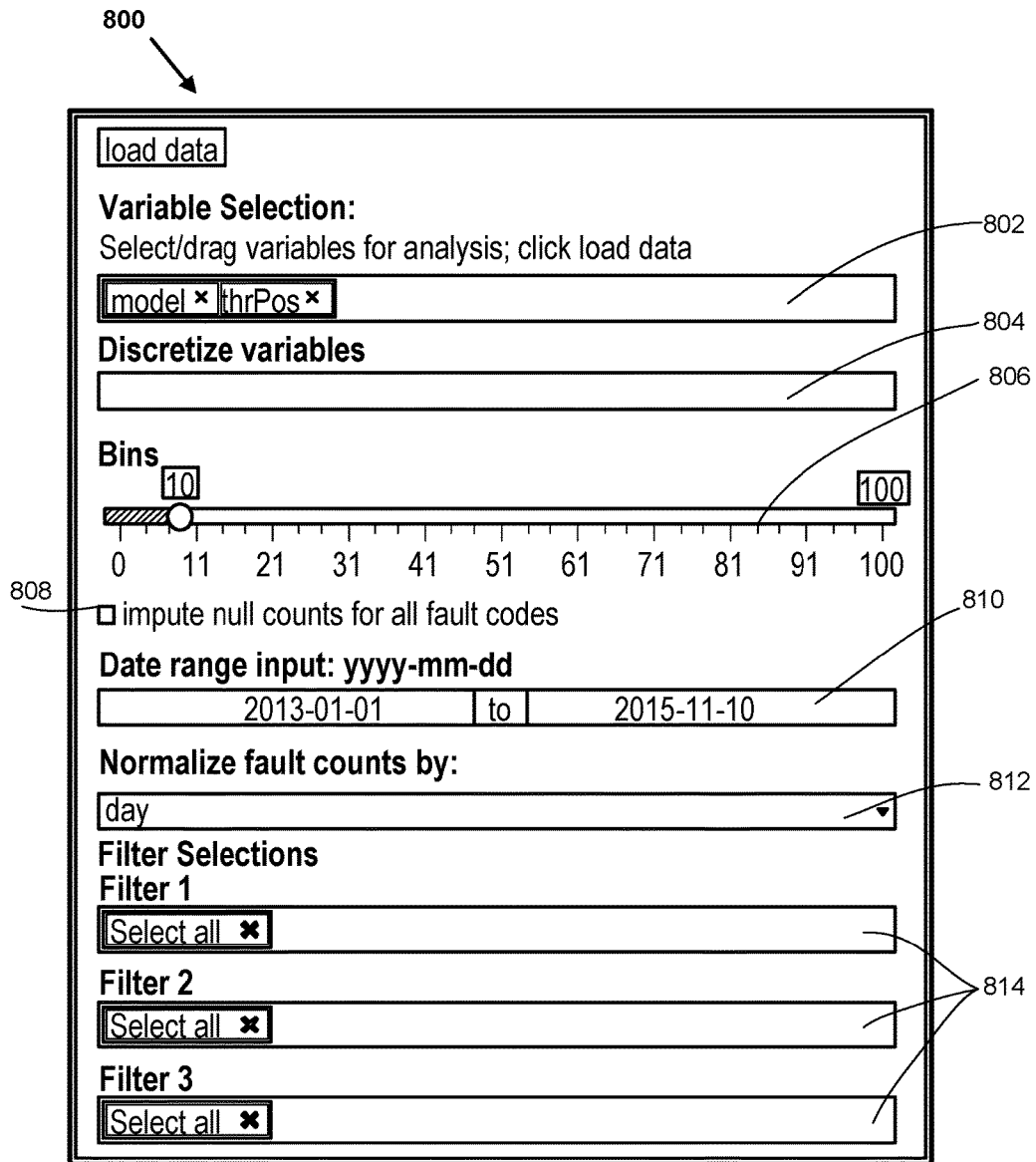
FIG. 8 is an example graphical interface displaying a selection pane of the interactive analysis tool.

Initially, a user may begin to use the interactive analysis tool by accessing a user interface at the user's client station (e.g., via a web application or a native application). In one implementation, once launched, at block 702, the asset data platform 102 may facilitate providing a graphical user interface (GUI) for display at the user's client station. For example, in the case of a web application, the asset data platform 102 may be configured to receive an HTTP request from the user's client station and in response transmit data to cause the user's client station to present the first screen of the GUI, such as the representative example interface 800 displaying a selection pane of the interactive analysis tool as shown in FIG. 8, corresponding to the interactive analysis tool. In another implementation, a native application running on the user's client station may provide the data to cause the presentation of the GUI's first screen. Other examples may also be possible.

Generally, the first screen of the GUI, as shown by example interface 800, may enable the user to make various selections to define which data should be analyzed, such as by selecting asset attributes the user wishes fault occurrence data to be analyzed for and selecting one or more filters to limit the scope of fault occurrence data taken into account by the analysis (i.e., a user may want to select faults belonging only to a particular model, operation mode, and/or range of temperatures at which the faults occurred.) Additionally, example interface 800 may further allow a user to specify how data should be treated by the analysis. For example, example interface 800 may provide the user the ability to "bin" an asset attribute value range into two or more groups of value ranges, select a unit of time by which to normalize fault occurrence data, and/or impute a null fault count value in regard to assets that have not reported faults pertaining to particular asset attribute combinations.

In one aspect, once launched, a user may select, via variable selection field 802 of example interface 800, two or more attributes to use for the analysis of fault occurrences.

In example embodiments, the selected two or more attributes may each comprise a given type of asset attribute with a range of possible values that may have a different impact on fault occurrences. Generally, the asset attributes may be composed of two categories of data, asset operating data and asset configuration data, which respectively may correspond to various types of asset operating data (e.g., fault code data, signal data, throttle position data, weather data, etc.) and of asset configuration data (e.g., model number, asset age, software versions etc.) Each attribute capable of being selected, via the interactive analysis tool, may correspond to a particular one of the various asset operating data or asset configuration data types.

Furthermore, each type of asset attribute information (e.g., model number, throttle position, software version, etc.) may be further comprised of a range of possible values that may have a different impact on fault occurrences. For example, "model number" is an asset attribute with a range of possible values, such as Model #1, Model #2, etc., with the values possibly having differing impacts on fault occurrences. As another example, "throttle position" is an asset attribute with a range of possible values, such as Idle, T1, T2, etc., and these values may also have differing impacts on fault occurrences.

In example embodiments, depending on the asset attribute being selected, the range of possible values may also take various forms. For instance, the above mentioned examples of asset attributes "model number" and "throttle position" are categorical in nature, meaning that their respective set of values is composed of a finite number of discrete values (e.g., particular model number or throttle positions). However, in other instances an asset attribute may have a range of values may be continuous in nature. For example, some instances of the asset attribute "weather" (e.g., temperature, pressure, humidity, etc.) may take the form of any value within a given range of attribute values.

Typically, selected asset attributes having continuous values may present a challenge in enabling a user to identify combinations of attribute values leading to fault occurrences across the population of assets. The reason being that such a selected asset attribute may cause fault occurrence data regarding vast number of asset attribute combinations (e.g., combinations including every value of a continuous attribute value range) to be presented to the user, thereby rendering it impractical for he or she to keep track of how one or more given asset attribute value combinations are affecting fault occurrences across the asset population. Therefore, the asset data platform 102 may facilitate "binning," or in other words, grouping a continuous attribute value range(s) into two or more attribute value ranges. As a result, the interactive analysis tool through its user interface may present to the user fewer attribute value combinations corresponding to fault occurrence data, allowing he or she to more readily identify how particular asset attribute value combinations affect fault occurrences.

In practice, the asset data platform 102's "binning" of a range of asset attribute values may result from one or more inputs being received by example interface 800. For example, the user may select particular asset attribute that they wish to "bin" via discretize selection field 804 and may additionally specify the number of "bins" (e.g., value range groups) to be formed for an asset attribute by providing an input to bin slider 806. In other instances, the asset data platform 102 may be configured to automatically "bin" asset attributes with continuous value ranges. Moreover, in examples, asset data platform 102 may function to "bin" asset attributes corresponding to a categorical range of values, either based on provided user input or automatically by the asset data platform 102.

In implementations, the interactive analysis tool may additionally receive one or more user inputs selecting filters that may further limit the scope of fault occurrence data taken into account for the analysis performed by the asset data platform 102. In one aspect, the user may specify a date range via date input field 810 of example interface 800 according to which the fault occurrence data to be analyzed should be confined by. In another aspect, the user may utilize filter selection fields 814 to narrow the fault occurrence data by specific parameter(s), such as fault codes of interest, software releases of interest, asset models of interest, operation modes of interest, order numbers of interest, state names of interest, among other possibilities.

Further yet, the user may specify a unit of time to which the temporal normalization of fault occurrence counts should be scaled to. Generally, the fault occurrences corresponding to each asset of the population may have occurred in reference to various timeframes, thereby rendering it difficult to accurately compare the total number of faults experienced by an individual asset to others of the population. Therefore, example interface 800 may allow a user to select via normalization drop-box menu 812 a unit of time by which the total number of faults experienced by an asset may be normalized by (e.g., hours, days, months, years, etc.). The normalization of fault count data will be discussed in further detail below and in some cases may be performed automatically by the asset data platform 102, without requiring a user selection.

Moreover, the first screen of GUI, may additionally enable the user to make one or more selections in regard to the imputation of null fault counts and/or "missing" signal data. For instance, via imputation selection box 808 of example interface 800 may be utilized by the user to cause the asset data platform 102 to impute null fault counts for assets that have not experienced faults in relation to particular asset attribute value combinations. The concept of imputation will be described in more detail below.

Returning to FIG. 7, after the two or more asset attributes are selected by the user, the asset data platform 102 may receive, at block 704, data indicating the attribute selections and any other user selections (e.g., "bin"-related selection(s), filter selection(s), normalization selection, imputation selection(s)).

At block 706, the asset data platform 102 may be configured to retrieve data reflecting the respective value of each selected asset attribute at the time of each fault occurrence across the population of assets. As one example, the asset data platform 102 may generate a query to facilitate accessing the one or more databases maintaining asset attribute data and retrieving for each fault occurrence experienced by the asset population the asset attribute values that correspond to the selected asset attributes. For example, if the asset data platform 102 received data, at block 704, data indicating a selection of asset attributes "throttle position" and "software version," it may retrieve the totality of fault occurrences experienced by the asset population as well as data reflecting the value of the model number and the value of the throttle position corresponding to each fault occurrence (e.g., model #1/Idle for first fault occurrence, model #2/T4 for second fault occurrence, etc.). Moreover, the query may additionally be generated based at least in part on any filter selections made via the tool, thereby limiting the amount of fault occurrence data examined and asset attribute data retrieved by the asset data platform 102. Further yet, the query may also facilitate the retrieval particular signal value measurements that were present at or around the time of the retrieved fault occurrences based on for example a selection of a signal value type (e.g., ambient temperature, humidity, engine temperature, etc.) made via the first screen of the GUI. The asset data platform 102 may retrieve the asset attribute data corresponding to the received selection(s) in various other manners well known in the art.

At block 708, the asset data platform 102 may be configured to perform various pre-processing operations in regard to the asset attribute data retrieved at block 706 to prepare the data for analysis. For example, the asset data platform 102 may facilitate "binning" continuous asset attribute value ranges, and/or normalizing fault data by a unit of time, among various other possibilities.

Additionally, at block 708, the asset data platform 102 may function to impute various forms of "missing" asset attribute data whose absence may otherwise cause the calculated statistical values to be skewed. That is, the asset data platform 102 may facilitate assigning values to "missing" asset attribute data to improve the accuracy of the fault occurrence data. In one instance, a given asset may not have experienced a fault associated with a particular asset attribute value combination(s), however, instead of excluding the given asset from the analysis of that specific combination(s), the asset data platform 102 may impute a "null" fault count (e.g., zero) for the given asset to improve the accuracy of the analysis. For example, if the asset attributes selected are "throttle position" and "software version" there may be certain throttle positions and/or software versions (e.g., asset attribute values) on an asset for which no fault data was received by the asset data platform 102 (e.g., no faults experienced by the asset while operating with those particular throttle position and/or configured with those particular software versions.) In this event, the asset data platform 102 may impute a fault count of zero for the asset, which for example may improve the accuracy of the normalized count of fault occurrences for each asset attribute value combination and/or the results of the outlier analysis for the group of fault occurrence counts produced by each asset attribute value combination.

In another instance, the asset data platform 102 may facilitate imputing signal data that is "missing" in relation to fault occurrence data. As mentioned, signal data, such as particular sensor and/or actuator values, may be a type of asset attribute (e.g., asset operating data) that may be selected. In some cases, however, a particular signal attribute value type may be "missing" corresponding to the time at which the fault was experienced by an asset of the population. This situation may occur, for example, when an asset transmits a data pack of asset attribute data upon a fault occurrence that only includes a subset of available asset operating data, when an asset periodically transmits asset operating data to the asset data platform 102 at a rate that does not temporally align with a given fault occurrence, among other possible scenarios.

To address this problem, the asset data platform 102 may impute signal data missing in relation to a given fault in various ways. For instance, the asset data platform 102 may impute a particular signal value of an asset attribute type based on values of that type that were received before and after the given fault, such as by calculating an average of such values weighted in accordance to their temporal proximity to the fault occurrence, among other possibilities.

In another instance, the asset data platform 102 may facilitate imputing a particular signal value of an asset attribute value type based on signal values of different but related attribute types. For example, a particular signal value corresponding to the asset attribute "Engine Temperature" may be "missing" in relation to a fault occurrence, however, asset attribute values corresponding to related attribute types "Weather", "R.P.M.", "Oil Level", etc. may be available. In this example, the asset data platform 102 may intelligently impute, such as through the execution of an algorithm or model, an "Engine Temperature" value based on those asset attribute values that may impact the engine temperature. Various other examples are possible and "missing" attribute values may be imputed in numerous other ways.

In examples, the asset data platform 102 may perform the pre-processing of block 708 based in part on user input and/or automatically. Furthermore, it should be noted that one or more of the pre-processing operations described in reference to block 706 may occur at various other times such as when the asset data platform 102 first receives asset attribute data from a given source, as the asset data platform 102 retrieves the asset attribute data for analysis, during the analysis that facilitates identifying asset attribute value combinations impacting fault occurrences across the population of assets, among other possibilities.

At block 710, the asset data platform 102 may be configured to generate data reflecting the respective count of fault occurrences that correspond to each combination of the selected attributes' values. For example, if the asset data platform 102 received, at block 704, data indicating the selection of asset attributes "throttle position" and "software version," with each attribute respectively corresponding to two attribute values (e.g., throttle position #1 and #2, software version #1 and #2) the asset data platform 102 may generate data reflecting the respective number of fault occurrences corresponding to the four possible asset attribute value combinations. That is, the number of fault occurrences that correspond to asset attribute values identifying (1) throttle position #1 or #2 when assets had software version #1 installed and (2) throttle position #1 or #2 when assets had software #2 installed. The previous example was presented for sake of explanation and it is contemplated that additional and/or different asset attributes may be selected each corresponding to a varying number of attribute values.

Furthermore, the data reflecting the respective number of fault occurrences that correspond to each combination of the selected attributes' values may take various forms. In one example, the number of fault occurrences that correspond to each attribute value combination may be determined for each individual asset in the population. That is, the asset data platform 102 may generate the data reflecting the respective number of fault occurrences on an asset-by asset basis to determine, for each individual asset in the population, the number of fault occurrences at the asset correspond to each combination of the selected attributes' values. In some instances, such generated data may be represented as a single sum for each asset created by tallying the number of faults that occurred when the various asset attribute value combinations were present, whereas in other instances the generated data for each asset may be composed of a plurality of fault occurrence totals each corresponding to the number of faults that occurred when a particular asset attribute value combination was present. In any event, this per-asset data may be represented as the "raw" number of fault occurrences for each asset attribute value combination, and/or may be represented as a normalized number of fault occurrences for each attribute value combination that is adjusted based on a given unit of time related to the particular asset.

As previously mentioned, the faults occurrences that compose the per-asset raw number of fault occurrences for each asset attribute value combination may have occurred in reference to various timeframes and therefore the asset data platform 102 may compensate for this by generating a per-asset normalized number of fault occurrences for each asset attribute value combination. For instance, on the surface it may appear that a first asset having a raw fault occurrence count of five seems to be functioning better than a second asset having a fault occurrence count of ten. However, if the first asset has been in operation for one year, while the second asset has been in operation for ten years, it becomes evident that the second asset experienced fewer fault occurrences over a unit of time (e.g., days, months, year) than the first and thus may be more "healthy" (or less prone to experiencing specific faults). Therefore, the asset data platform 102 may be configured to divide the per-asset raw number of fault occurrences for each attribute value combination by a unit of time in order to facilitate generating a normalized number of fault occurrences.

The per-asset raw data may be normalized based on a variety of factors that generally relate to asset attribute data such as asset age, days an asset has been operating (e.g., in active use), among others. Additionally, the per-asset raw data may be normalized based on the amount of time an asset has had a particular configuration. For example, a raw number of fault occurrences for an asset corresponding to the asset attribute value combination "software version #1/throttle position #4" may be normalized based on the number of days software version #1 was installed on the asset and/or the number of days the asset operated in throttle position #4. Further yet, the normalization of per-asset raw data may be based on various variables related to the total amount of work performed by a given asset (e.g., total energy output, distance traveled, etc.), thereby controlling for situations in which the given asset may, historically, be more heavily utilized relative to other assets in the population. The per-asset raw data may be normalized based on a variety of other time dependent asset information. As mentioned, the timeframe over which to normalize the raw total fault count data may be automatically determined by the asset data platform 102 or chosen by a selection made via a GUI, such as example interface 800.

Additionally, the asset data platform 102 may further generate, based on the per-asset data reflecting the number of fault occurrences for each combination of the selected attributes' values, data reflecting the number of fault occurrences across the asset population as a whole. That is, the asset data platform 102 may aggregate the per-asset fault occurrence counts for each asset attribute value combination, thereby resulting in an aggregated number of fault occurrences across the asset population for each attribute value combination. For instance, if two asset attributes have been selected such as "throttle position" and "software version" that each correspond to two asset attribute values, the asset data platform 102, during the aggregation operation may determine the total number faults occurrences in the population of assets for each attribute value combination (e.g., throttle position #1/software version #1, throttle position #1/software version #2, throttle position #2/software version #1, throttle position #2, software version #2). Similar to the per-asset data, the aggregated data may be represented as the raw number of fault occurrences across the asset population for each asset attribute value combination, and/or may be represented as a normalized number of fault occurrences across the asset population for each attribute value combination that is adjusted based on a unit of time related to the asset population as a whole (e.g., the aggregated number of days that the assets in the population have been in operation and/or have has a particular configuration, etc.) For example, the asset data platform 102 may determine normalized number of fault occurrences across the asset population for each attribute value combination by dividing the raw count across the population per an attribute value combination by the total number of days the assets corresponding to a given combination have been in operation.

At block 712, the asset data platform 102 may be configured to identify one or more "outlier" combinations of selected attributes' values that correspond to an abnormally large number of fault occurrences relative to other combinations of selected attributes' values. In one instance, the asset data platform 102 may utilize the normalized number of fault occurrences across the asset population for each attribute value combination to determine a significance value (e.g., p-value) and/or a multiplicative coefficient for each combination of selected attributes' values. A significance value for a given combination of selected attributes' values may reflect the significance of the difference of the normalized number of fault occurrences for a given attribute value combination from that of the average normalized count of fault occurrences for the rest of the population (i.e., the degree to which the given attribute value combination's normalized number of faults across the population of assets is an outlier). Further, a multiplicative coefficient for a given combination of selected attributes' values may reflect how many more faults (multiplicatively) belonging to a given combination group is likely to result in, compared to the average normalized count of fault occurrences for the population. Generally, the aforementioned metrics reflect the degree to which each given attribute value combination of selected attribute' value is an "outlier" relative to other attribute value combinations.

The asset data platform 102 may perform this outlier analysis in various manners. According to one implementation, the asset data platform 102 may employ an outlier detection algorithm that takes into account the distribution (e.g., Normal, Poisson, Quasi-Poisson, etc.) of the number of fault occurrences corresponding to each of the various combinations of asset attribute values and creates and/or applies a model to facilitate identifying how belonging to a given attribute value combination deviates from the average normalized count for the population. In this respect, the algorithm may enable the data to be fit to a model that captures the data's "normal" behavior, thereby allowing the asset data platform 102 to identify whether a combination(s) is an "outlier" by evaluating the quality of the fit between the model and the data point(s) corresponding to the combination(s).

According to another implementation, the asset data platform 102 may employ an Analysis of Variance (ANOVA) method to evaluate and identify outliers. Other methods for evaluating and identifying outliers are possible as well.

At block 714, the asset data platform 102 may be configured to present various types of data regarding the fault occurrences to the user via the user interface. For instance, the asset data platform 102 may present the user with data reflecting the number of fault occurrences that correspond to each combination of the selected attributes' values (on a per-asset basis and/or for the asset population as a whole) as well as an indication of whether any one or more asset attribute value combinations are outliers. Moreover, the asset data platform 102 may present the data regarding the fault occurrences in various different interface views which will be discussed below in reference to FIGS. 9-16b.

Generally, the asset data platform 102 may present the fault occurrence data via the various views by generating visualization file(s) or the like that are renderable by the client station running or accessing the interactive analysis tool. In some cases, the asset data platform 102 may prepare the views by encoding them in a variety of formats, such as hypertext markup language, which may be transmitted to a client station as a data visualization file(s) that includes html code, scripting code, and/or image files. Other examples are also possible.

FIGS. 8-16b are example graphical user interfaces (GUIs) that may be displayed by a client station via the user interface. FIGS. 8-16b are presented for the purposes of example and illustration only and should not be construed as limiting. The asset data platform 102 may present the various views in a wide variety of forms, such as those addressed above. Further, the various interfaces may contain additional or fewer elements than those presented in FIGS. 8-16b.

As addressed above, FIG. 8 is an example interface 800 displaying a selection pane of the interactive analysis tool. In operation, a user may utilize example interface 800 to make various selections in order to define what should be presented in display in a data visualization pane. Although not shown, example interface 800 may be persistently presented along-side the data visualization pane (i.e., to the left, right, etc., of the data visualization pane). In such instances, the data visualization pane may initially be presented as empty (e.g., prior to selections being made via example interface 800).

Utilizing example interface 800, for example, the user may select two or more asset attributes via variable selection field 802. In the exemplary case of example interface 800 the user has selected two asset attributes "model" and "throttle position." The selection of the attributes may be made by accessing dropdown menu associated with selection field 802 and selecting particular attribute, by dragging certain asset attributes from a list of available attributes to selection field 802, by the user manually entering an asset attribute name in selection field 802, among other possibilities that are well known in the art. The manner through which selections may be made in regard to selection field 802 may equally apply to the various other selection fields depicted by example interfaces 800-1100.

Additionally, the user may make selections via discretize selection field 804 and bin slider 806 related to the "binning" of an asset attribute value range into two or more groups of attribute value ranges. For example, the user may make a selection of one or more asset attributes via discretize selection field 804 that the user wishes to "bin." Moreover, the user may further specify through providing input via bin slider 806 the number of "bins" (e.g., groups of asset attribute value ranges) that he or she prefers to be applied to the attributes selected via discretize selection field 804. In some implementations, the number of bin sliders provided by example interface 800 may be a function of the number of asset attributes selected for discretization, thereby enabling the user to select the number of "bins" to be applied on an attribute-by-attribute basis.

Example interface 800 may further enable the user to make one or more selections regarding the imputation of data values. For example, the user may select imputation selection box 808 if he or she wishes null fault counts to be imputed for assets having no faults associated with various asset attribute value combinations. Although not shown, example interface 800 may additionally provide various other interface elements that may enable a user to make selections pertaining to imputation, such as selection fields allowing the user to select one or more attributes for which "missing" data values (e.g., signal data values) may be imputed, among other possibilities.

Moreover, example interface 800 may allow the user to make a selection as to a unit of time by which to normalize the fault occurrence data. For example, a user may access normalization drop-box menu 812 and select the unit of time (e.g., hour, day, week, year, etc.) to be used for normalization.

Further still, example interface 800 may be capable of receiving various inputs that may be capable of filtering the amount of fault occurrence data taken into account by the asset data platform 102. In one instance, the user may specify a date range via date input fields 810, that may allow the user to select a date range for which asset attribute data should be analyzed. Selections via the date range fields 810 may be made by accessing a drop-down menu, by manually inputting dates, through selections made via a calendar, among other possibilities.

In another instance, a user may filter data by way of making selections via filter selection fields 814. Through such selections a user may filter the fault occurrence data taken into account by the asset data platform 102 by op mode, fault code, order number, asset model, asset subsystem, state name, software release, among numerous examples.

After selections are made via the selection pane of example interface 800, the user may confirm the selections by providing an input to the load data icon 816 which may cause method 700 to be executed.

Figure 9:
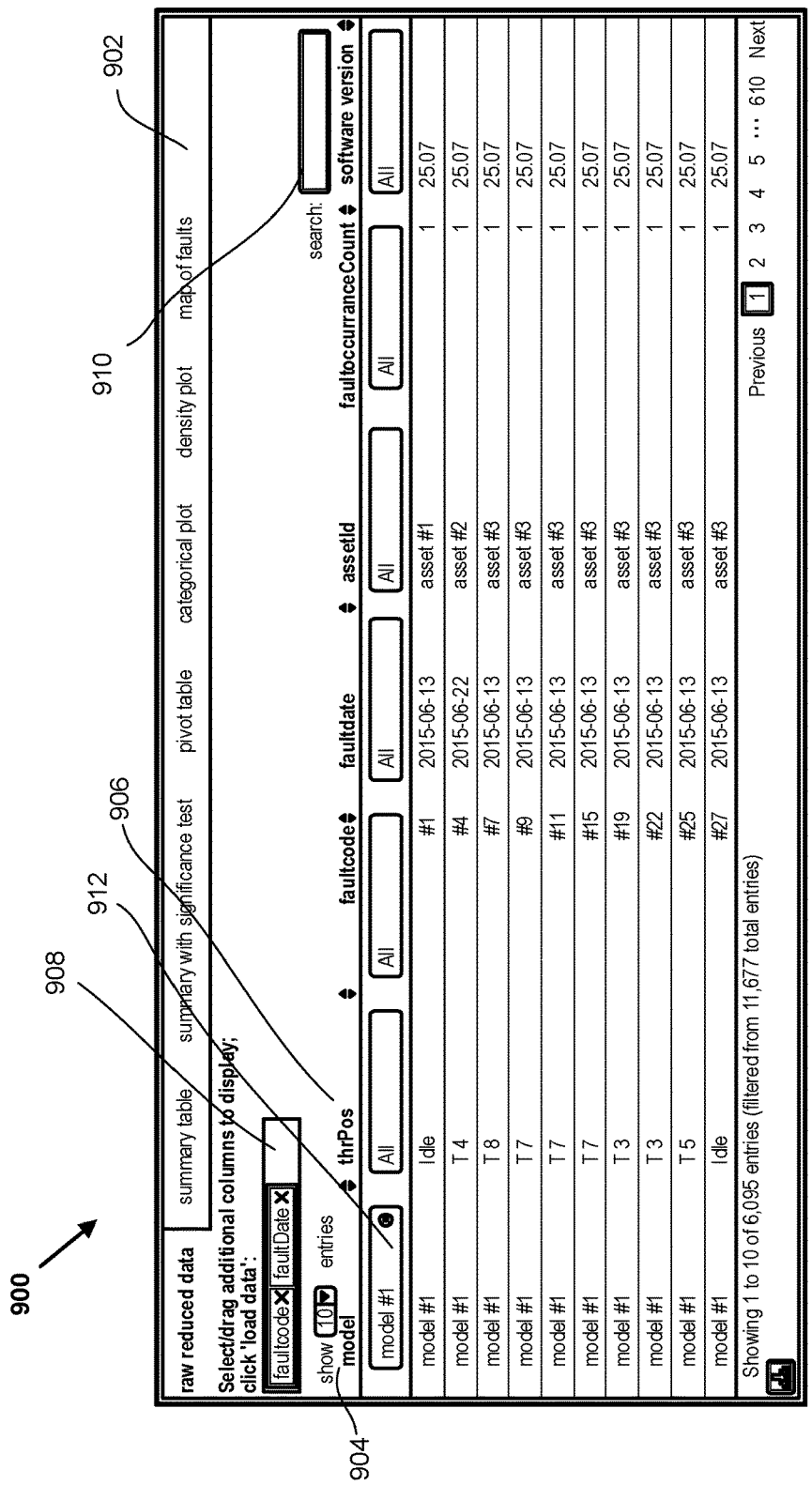
FIG. 9 is an example graphical interface displaying a raw reduced data view.

FIG. 9, is an example interface 900 displaying a populated data visualization pane displaying data in accordance with the selections made via the selection pane of interface 800. As shown, the data visualization pane may include an array of tabs 902 that may be each selectable by a user to navigate to the various views of the interactive analysis tool. As seen from interface 900 raw reduced data tab has been selected and/or initially displayed and thus the data visualization pane may be populated with the raw reduced data view.

Generally, the raw reduced data view may provide an "at a glance" view of all fault occurrences for the population of assets. That is, the raw reduced data view may be capable of displaying the particular attribute values corresponding to the selected attributes for each fault occurrence across the population of assets. As shown by example interface 900, each row of the raw reduced data corresponds to a unique fault occurrence in the population and shows in columns 904 and 906 the values for the selected attribute (e.g., "model" and "throttle position", as well as other information related to the fault occurrence, such as fault type (e.g., fault code), the date of the fault, the particular asset at which the fault occurred, and the software version running when the fault occurred.

Through example interface 900, the user may make various selections to adjust the data being displayed by the raw reduced data view. For example, the user may utilize additional column display selection field 908, to add columns of data to and/or remove columns of data from the view. As seen, the data columns "fault code" and "fault date" have been selected via selection field 908, and thus those columns are displayed in the raw reduced data view. Furthermore, the user may provide inputs to search box 910 to facilitate performing a search for specific data, such as by the date of the fault occurrence, the results of which may then be displayed by interface 900. Additionally, the user may filter the data displayed by making selections via the various filter fields beneath each column header, such as representative filter field 912 (i.e., model #1 is shown as selected in filter field 912 and therefore the column is presently displaying fault occurrences experienced by model #1). Further yet, the raw reduced data view may allow each column to be sorted in ascending or descending order, additional entries shown, pages of data to be navigated to, etc., in response to user input.

FIG. 10, is an example interface 1000 displaying a populated data visualization pane showing a summary table view. In practice, the summary table view displays the total number of raw and normalized fault counts experienced by each individual asset of a population on a per attribute value combination basis. For instance, row 1002 of the summary table shows that the number of fault occurrences at Asset #1 for the attribute combination of Model #1 and an Idle throttle position is a raw number of 9 total faults and a normalized number of 0.049 faults per day. The other rows of the summary table then show similar data for other assets and/or other attribute value combinations. Furthermore, the data displayed by the summary table may be adjusted by a user in a similar manner to that of the raw reduced view (e.g., filter, search, sort, page navigation, etc.).

FIG. 11 is an example interface 1100 displaying a populated data visualization pane showing a summary table with significance test view. This view may differ from that of the summary table view in that it may display the fault data aggregated by asset attribute value combination only, as opposed to on an asset-to-asset basis. Generally, the summary table with significance test view may enable a user to visualize the affect particular asset attribute value combinations may have on the number of faults experienced across a population of assets.

In addition to showing the possible asset attribute value combinations, the summary table view may show both the normalized number of fault occurrences across the population of assets for each attribute value combination and the data utilized to determine the number of normalized faults across the population. Taking, for example row 1102, which indicates that for the attribute value combination of Model #1 and a throttle position #8, the asset population has experienced 232,317 raw fault counts in 2,369,762 raw days (e.g., total number of days for all assets experiencing the faults), resulting in a normalized fault count of approximately 35.7892 (e.g., raw fault counts divided by raw days).

Additionally, based on the determined normalized number of fault occurrences across the population of assets for each attribute value combination example interface 1100 may additionally depict one or more values that may be utilized to identify one or more outlier combinations of asset attribute value combinations that correspond to an abnormally large number of fault occurrences relative to the other combinations. Referencing row 1102 once again, it can be seen that the summary table with significance test view may display information regarding the normalized median of fault counts by asset (e.g., 23.379420), the standard error (e.g., 0.9709650), the multiplicative coefficient (e.g., 10.156567), the number of assets in the attribute value combination group and/or which have experienced faults for the attribute value combination (e.g., 1,966), and the p-value (1.00047e^-10). Furthermore, the data displayed by the summary table may be adjusted by a user in a similar manner to that of the raw reduced view (e.g., filter, search, sort, page navigation, etc.).

FIG. 12, is an example interface 1200 displaying a populated data visualization pane showing a pivot table view. In general, this view may display the normalized number of fault occurrences across the population of assets for each attribute value combination in a two dimensional table, in which asset attribute values corresponding to a first selected attribute may be listed across a horizontal axis and attribute values corresponding to a second selected attribute may be listed across a vertical axis.

For example, as shown by pivot table view of example interface 1200, the horizontal axis 1202 lists the various models and the vertical axis 1204 lists the various throttle positions. Moreover, at the various intersections of the horizontal and vertical axes the pivot table view may display a cell, such as representative cell 1206, displaying the normalized number of fault occurrences across the population of assets for each attribute value combination, represented by the intersection. Moreover, as may be seen from the pivot table view of example interface 1200, each cell may be displayed with an overlaid bar, such as representative bar 1208, that may serve to indicate the outlier significance of the normalized number of fault occurrences across the population of assets for each attribute value combination shown by a given cell.

In some implementations, the width of a given overlaid bar may be proportional to the outlier significance (e.g., the wider the bar the higher the outlier significance). That is, the width of the bar may have an inverse relationship with the calculated p-value for a given attribute value combination. Furthermore, each overlaid bar may be colored differently dependent on whether the p-value corresponding to a particular attribute value combination is above or below a p-value threshold value, which may reflect which normalized number of fault occurrences across the population of assets for each attribute value combination are outliers. For example, bars corresponding to p-values below the p-value threshold may be colored red, while bars corresponding to p-values above may be colored blue. Various other examples are also possible.

The aforementioned p-value threshold made be determined in various ways. In one instance, the p-value threshold may be defined by the user, such as by providing an input to p-value slider 1210. In other instances, the p-value threshold may be predefined or dynamically adjusted by the interactive analysis tool.

Figure 13A:
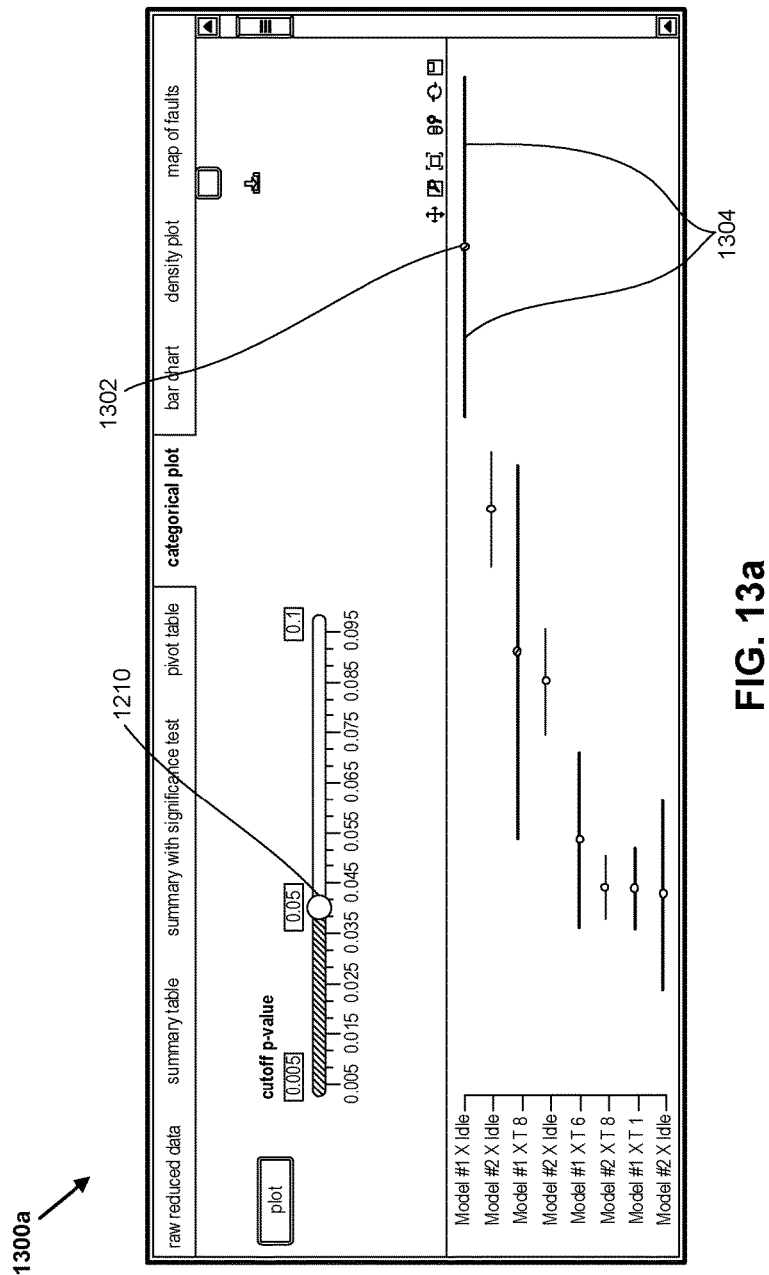
FIG. 13a is an example graphical interface displaying a categorical plot view.

FIG. 13a, is an example interface 1300a displaying a populated data visualization pane showing a categorical plot view. In practice, the categorical plot view may be displayed as a two dimensional plot showing various attribute value combinations listed on a vertical axis and a range of normalized number of fault occurrences across the population of assets listed on a horizontal axis. Within the plot, example interface 1300a may show points illustrating the normalized number of fault occurrences across the population of assets for each attribute value combination, such as representative point 1302, along with horizontal visual elements on either side of the point conveying the standard error for each asset attribute value combination, such as representative horizontal bars 1304.

In example embodiments, and similar to that of the pivot table view, the categorical plot view may show each point representing the normalized number of fault occurrences across the population of assets for each attribute value combination as colored (e.g., red, blue, etc.) based on whether the p-value is above or below a threshold p-value as set via p-value slider 1210 or a p-value threshold defined by the tool.

Moreover, the various points included in the categorical view may be capable of receiving a user input (e.g., mouseover, click selection, etc.) to facilitate causing the display of additional information regarding the analysis of the particular attribute value combination to which a given point corresponds.

Figure 13B:
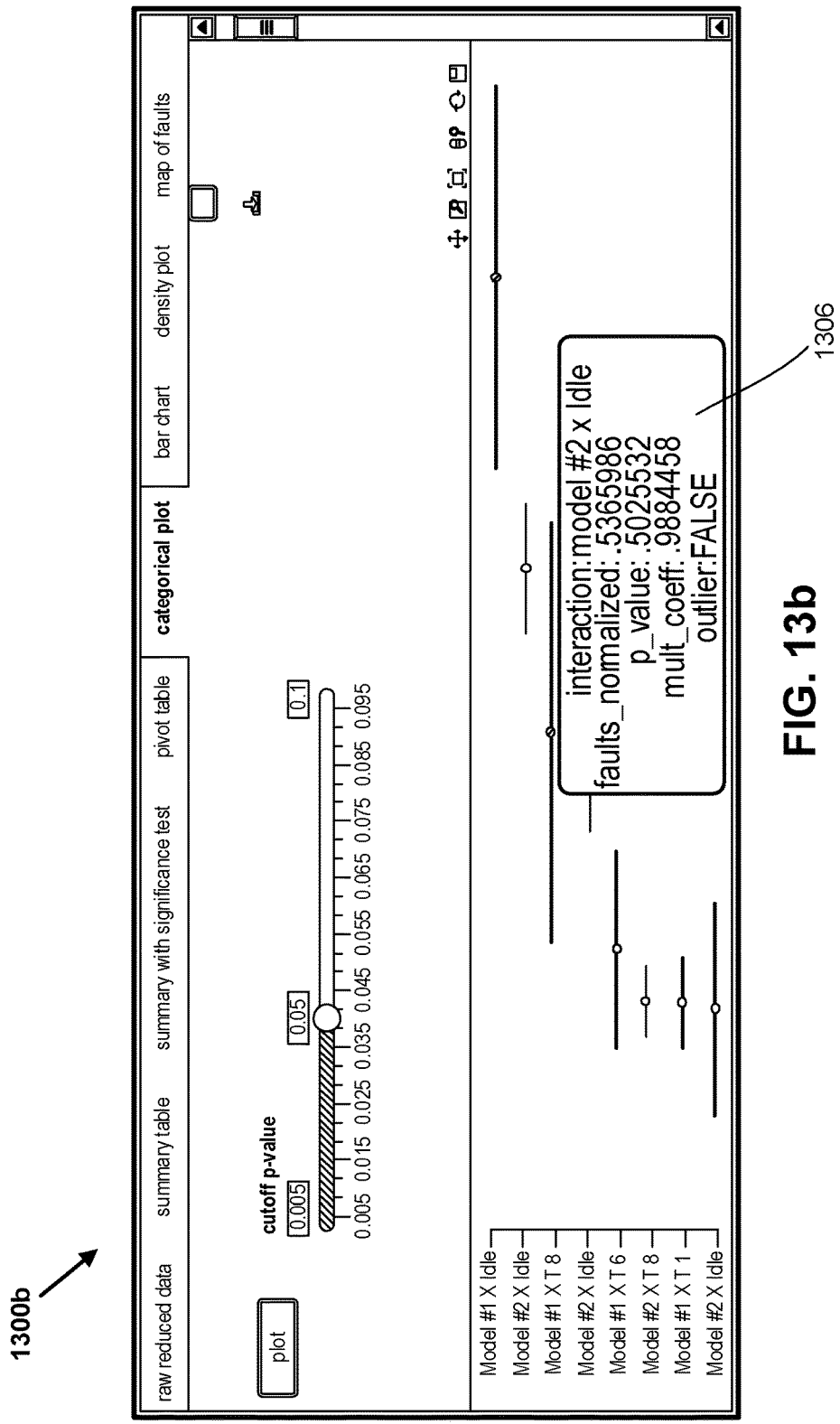
FIG. 13b is an example graphical interface displaying an information pop-up overlaid on a categorical plot view.

FIG. 13b, is an example interface 1300b displaying an information pop-up overlaid on a populated data visualization pane showing a categorical plot view.

As stated, in examples, a user input made to a point in a displayed categorical view may result in additional information being presented in the view, which may be in the form of a pop-up window 1306. As can be seen in example interface 1300b the additional information may include the asset attribute value combination to which the selected point corresponds, the normalized number of fault occurrences across the population of assets for each attribute value combination, the multiplicative coefficient, the p-value, an indication as to whether the normalized number of fault occurrences across the population is an outlier. Although not shown, various other forms of above-discussed information may be additionally displayed.

Figure 13C:
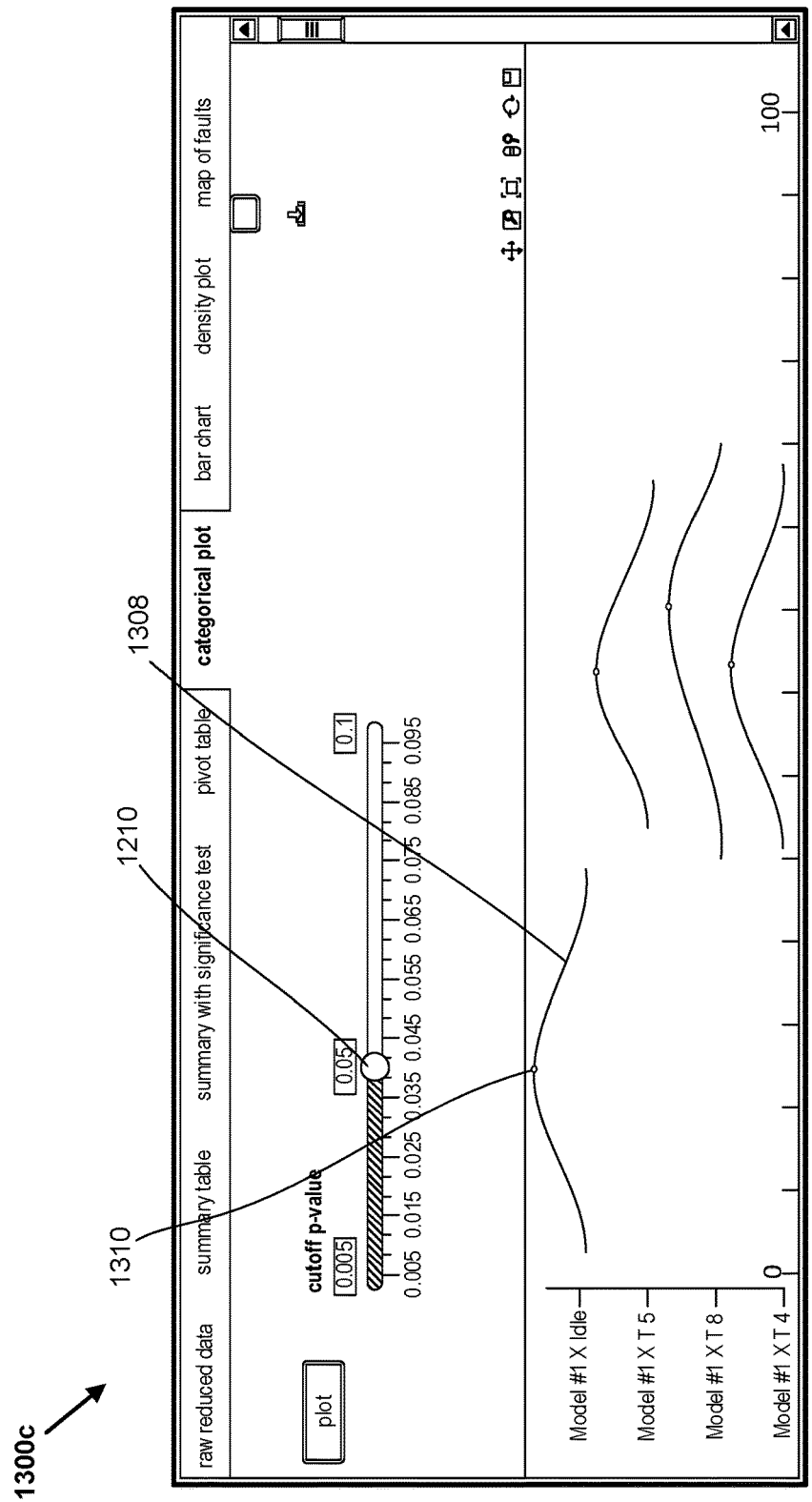
FIG. 13c is an example interface displaying a sensor plot view.

FIG. 13c, is an example interface 1300c displaying a populated data visualization pane displaying a sensor value plot view. Although interface 1300c is depicted as being a sub-view of the categorical plot view (e.g., corresponding to a selected categorical plot tab), it should be understood that the sensor value plot view may be associated with various other views (bar chart tab, pivot table tab, etc.) and/or may be independent (e.g., having its own tab) of other views.

In general, the sensor plot view may enable users to visualize distributions, on a per asset attribute value combination basis, regarding a particular type of signal values (e.g., ambient temperature, humidity, engine temperature, etc.) measured by sensors and/or actuators at or around the time of the fault occurrences reported by the population for the attribute value combinations. In this respect, the sensor plot view may function to present the users with information that may help them identify why a particular variable value combination may be an "outlier."

In practice, the sensor plot view may be displayed as a two dimensional plot showing various attribute value combinations listed on a vertical axis and a range of signal values, which may vary dependent on the signal value type, listed on a horizontal axis. Within the plot, example interface 1300c may show for each displayed attribute value combination a distribution, such as representative distribution 1308, of the signal values captured at or around the time of the fault occurrences belonging to a given combination.

In example embodiments, and similar to that of the categorical plot view, the sensor plot view may overlay on each displayed distribution of signal values a point, such as representative point 1310, colored based on whether the p-value for the attribute value combination to which a given distribution corresponds is above or below a threshold p-value as set via p-value slider 1210 or a p-value threshold defined by the tool. That is, the color of the point may indicate whether a given signal value distribution corresponds to an attribute value combination that has been determined to be an "outlier."

The sensor plot view may be populated based on one or more received user inputs. For example, a user may select, via selection pane 800 a particular type of signal value he or she desires to view distributions of in the sensor plot view. Additionally, the user may select, via the categorical plot view and/or from the various other views described herein a specific subset of attribute value combinations to include in the sensor plot view. For instance, the user may only want to view signal value distributions for combinations identified as "outliers," to compare an "outlier" combination's signal value distribution to distributions corresponding to certain non-outlier combinations, etc., and thus he or she may make the appropriate selections of combinations to display that suit a given preference.

As an illustrative example, we may assume that representative distribution 1308 is the only one depicted by example interface 1300*c* corresponding an "outlier" combination (e.g., Model #1×Idle) and that the signal value type selected is ambient temperature. In such a scenario, it may be deduced from example interface 1300*c* that Model #1 may be experiencing an abnormally large number of faults in an Idle throttle position due to relatively colder temperatures. Various other examples are also possible.

Figure 14:
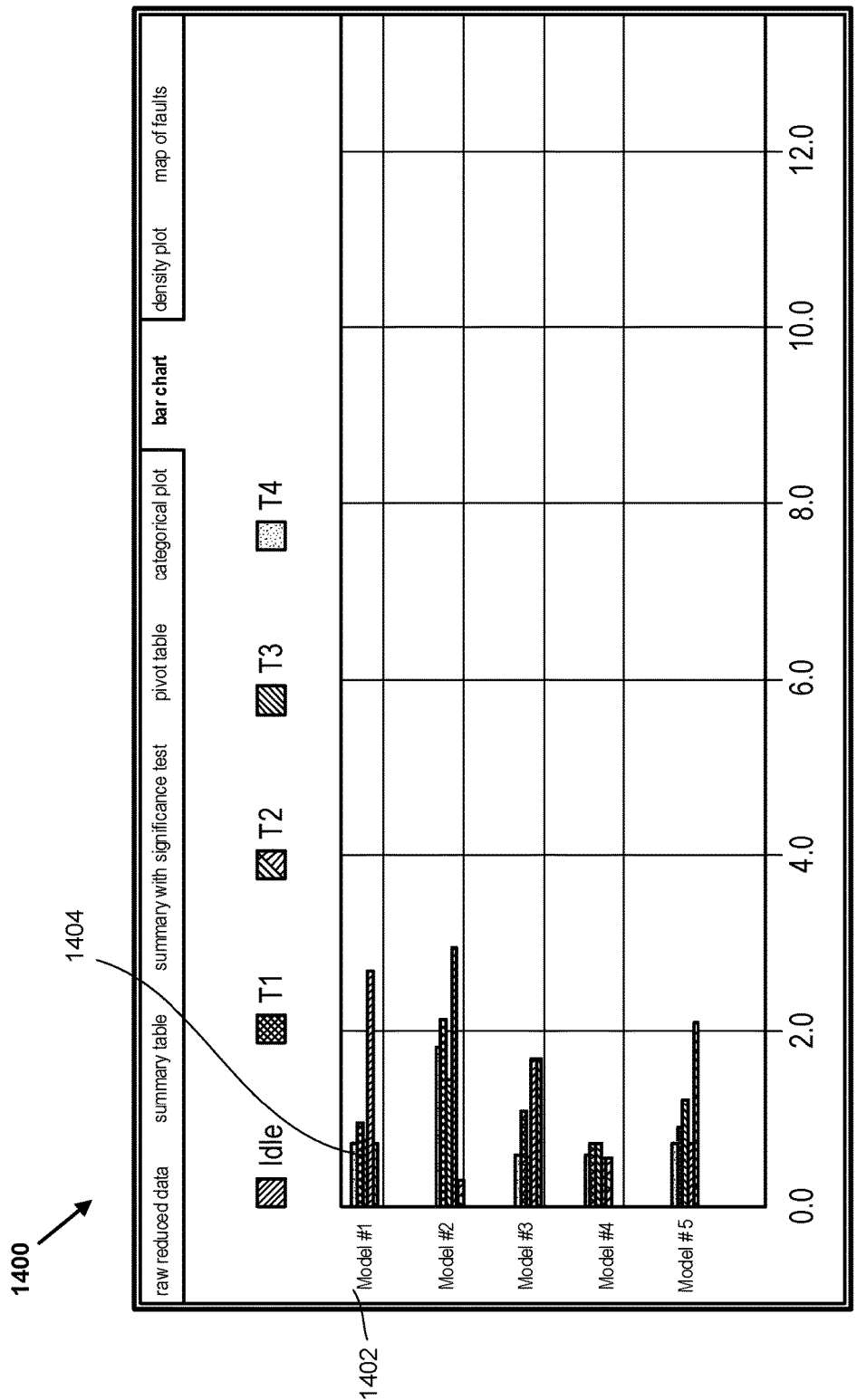
FIG. 14 is an example graphical interface displaying a bar chart view.

FIG. 14, is an example interface 1400 displaying a populated data visualization pane showing a bar chart view. The bar chart view generally may depict the normalized number of fault occurrences across the population of assets for each attribute value combination as horizontal bars, wherein a vertical axis lists asset attribute values corresponding to a first one of the selected attributes and the horizontal axis lists a range of normalized number of faults across the asset population. In this view, each attribute value listed on the vertical axis may correspond to one or more bars color-coded by attribute values corresponding to a second selected attribute. In this sense, the attribute values listed on the vertical axis may serve to group various attribute value combinations.

For example, as seen in example interface 1400, listed attribute value 1402 corresponding to Model #1 is associated with bars 1404 corresponding to throttle positions Idle-#4. As such, the listed attribute value 1402 is utilized to group various attribute value combinations in which Model #1 is a member.

In example implementations, a user may provide various inputs to the bar chart view to adjust the data that is displayed. For instance, an input may be provided that causes the asset attribute value combinations to be grouped by attribute values corresponding to the second selected attribute. For example, in the case of the bar chart view of example interface 1400 such an input may cause various throttle position attribute values to be listed on the vertical axis (e.g., instead of the model numbers) and color-coded bars being displayed each corresponding to a particular model number. In another instance, a user may provide an input that toggles (e.g., select or deselect) various bars corresponding to attribute values in the display.

Figure 15:
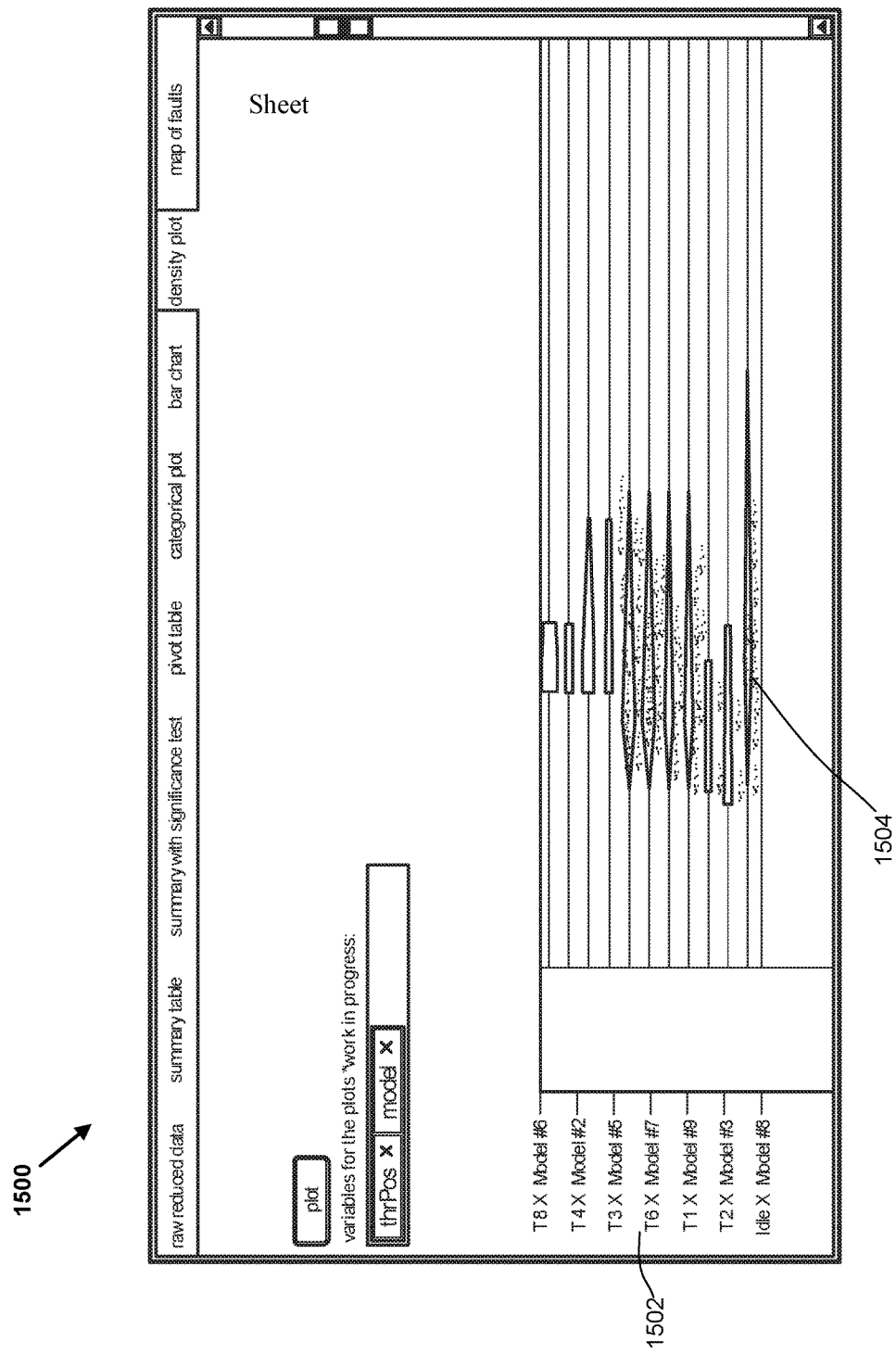
FIG. 15 is an example graphical interface displaying a density plot view.

FIG. 15, is an example interface 1500 displaying a populated data visualization pane showing a density plot view. Typically, the density plot view may depict the normalized fault counts on a per asset for each attribute value combination as a jittered distribution, in which a vertical axis lists each attribute value combination and the normalized fault count per an asset per a attribute value combination is distributed across a horizontal axis.

For example, representative attribute value combination 1502 (e.g., Model T6×Model #7) corresponds to various jittered points that each represent a normalized fault count per a given asset. In addition to the jittered distribution, the density plot may additionally show a violin plot corresponding to each asset attribute value combination, such as violin plot 1504, which may be a continuous model of the probability density of the normalized fault counts.

Figure 16A:
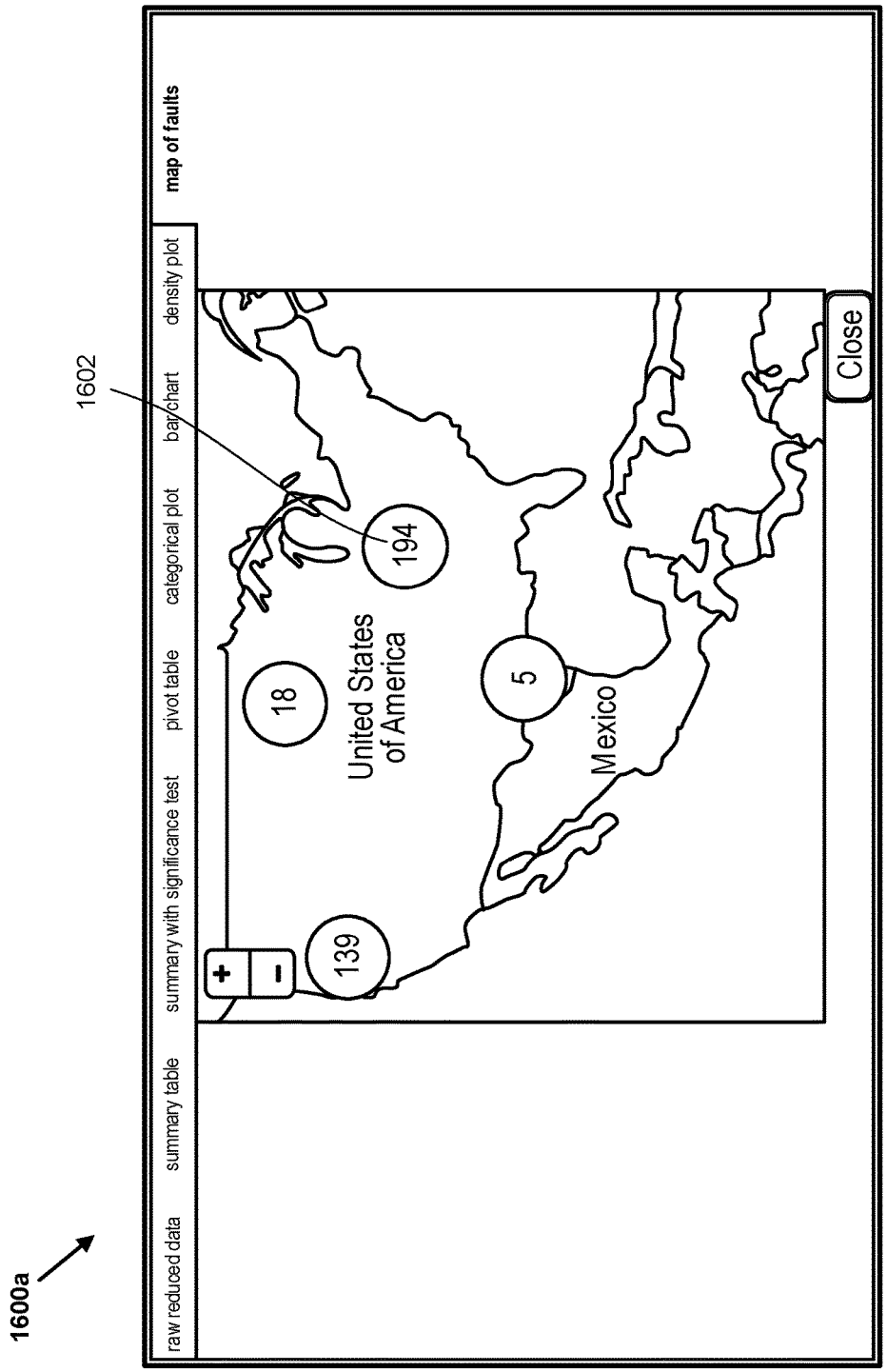
FIG. 16a is an example graphical interface displaying a faults map view.

FIG. 16*a*, is an example interface 1600*a* displaying a populated data visualization pane showing a faults map view. The faults map view may depict a geographical distribution of the faults returned based on the selections made via example interface 800.

As depicted in example interface 1600*a*, the faults map view may depict faults occurring within a geographic area together in a cluster, such as representative cluster 1602. Each cluster depicted may include the number of fault occurrences experienced by assets within the geographic area, and may further be color-coded based on the number of faults within a given cluster. In one example, a cluster containing a high number of faults may be displayed as orange, a medium number of faults may be displayed as yellow, and a low number of faults displayed as red. Various other color combinations are possible.

In the faults map view, the user may provide an input by selecting a given cluster, or otherwise provide a zoom input, to zoom into the map and show smaller clusters of faults that constitute the larger cluster of faults.

Figure 16B:
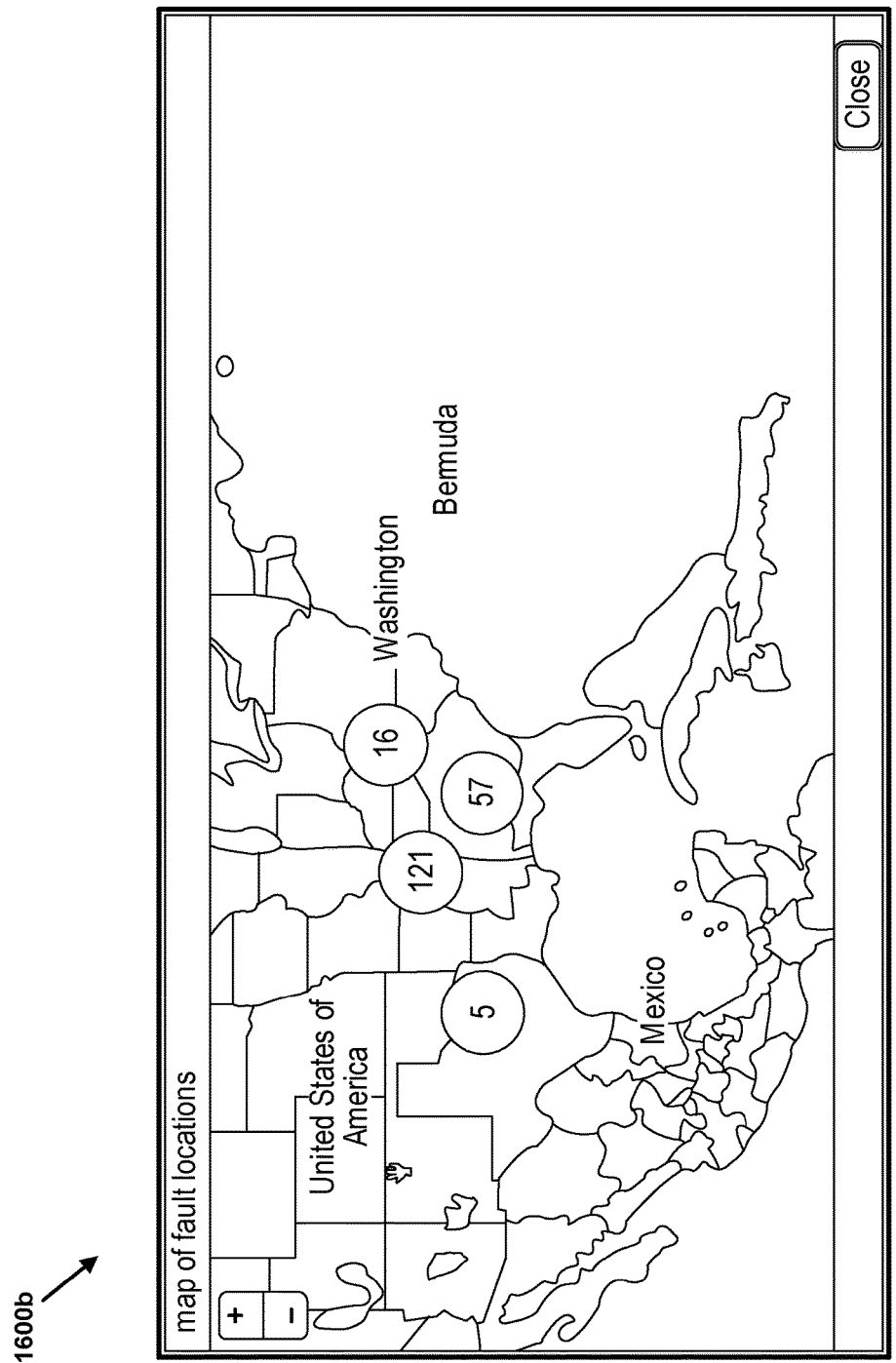
FIG. 16b is an example graphical interface displaying a zoomed in faults map view.

FIG. 16*b*, is an example interface 1600*b* displaying a zoomed in faults map view. This view displays the result of a selection made to cluster 1602 in example interface 1600*a*. Similarly, each smaller cluster depicted in example interface 1600*b* may be selected to further zoom into the map and display smaller clusters. In this respect, the zooming may be repeated until an individual fault occurrence is drilled down to in the faults map view. In the event a given individual fault is shown via the faults map view, it may be selected to display a pop-up window containing additional details regarding the given fault occurrence.

The faults map view may additionally enable a user to provide input to adjust the displayed data. In one example, a user may provide input to cause the display various points of interest (e.g., tunnels, repair shops, rail-lines, mine sites, airports, etc.) on the map. In another example, a user may adjust the geographic radius encompasses by a cluster(s). That is, the user may define the furthest distance from the center of a given cluster at which a fault occurrence would be included in that cluster. As yet another example, a user may provide an input disabling clusters in the faults map view and hence cause the display of only individual faults in faults map view.

V. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
 a network interface configured to facilitate communications over a communication network with one or more asset-related sources and one or more client stations;
 at least one processor;
 a non-transitory computer-readable medium; and
 program instructions stored on the non-transitory computer-readable medium that are executable by the at least one processor to cause the computing system to:
  receive, via the network interface from a client station configured with a user interface for use in analyzing fault occurrences across a population of assets, data indicating two or more variables that have been selected by a user via a selection pane of the user interface that includes a variable selection field, wherein the two or more variables each comprise a respective type of asset attribute having a range of possible values;

access data reflecting the respective values of the two or more selected variables at the time of each fault occurrence for the population of assets;

based on the accessed data, determine a respective number of fault occurrences aggregated across the population of assets for each combination of values of the selected two or more variables;

identify at least one outlier combination of values of the selected two or more variables that corresponds to an abnormally large number of fault occurrences relative to the other combinations of values of the selected two or more variables; and transmit, via the network interface to the client station, data that causes the client station to present a visualization pane of the user interface that provides (1) an indication of the respective number of fault occurrences aggregated across the population of assets for each combination of values of the selected two or more variables and (2) an indication of the identified at least one outlier combination of values of the selected two or more variables, wherein the visualization pane of the user interface comprises one or more of a summary table view, a pivot table view, a categorical plot view, a bar chart view, and a density plot view.

2. The computing system of claim 1, further comprising program instructions stored on the non-transitory computer-readable medium that are executable by the at least one processor to cause the computing system to:

provide, via the network interface to the client station, data that defines the user interface for use in analyzing fault occurrences across the population of assets.

3. The computing system of claim 1, wherein the population of assets comprises a group of assets selected by the user via the user interface.

4. The computing system of claim 1, wherein the program instructions that are executable to cause the computing system to determine the respective number of fault occurrences aggregated across the population of assets for each combination of values of the selected two or more variables comprise program instructions stored on the non-transitory computer-readable medium that are executable by the at least one processor to cause the computing system to, for each given combination of values of the selected two or more variables:

analyze the data reflecting the respective values of each selected two or more variables at the time of each fault occurrence for the population of assets to identify each fault occurrence for which the respective values of each selected two or more variables comprise the given combination of values of the selected two or more variables; and tally the number of identified fault occurrences.

5. The computing system of claim 4, wherein the program instructions that are executable to cause the computing system to determine the respective number of fault occurrences aggregated across the population of assets for each combination of values of the selected two or more variables further comprise program instructions stored on the non-transitory computer-readable medium that are executable by the at least one processor to cause the computing system to, for each given combination of values of the selected two or more variables:

normalize the tallied number of identified fault occurrences based on time value that reflects an amount of time that the assets in the population have been in use or a variable reflecting utilization of the assets.

6. The computing system of claim 1, wherein the program instructions that are executable to cause the computing system to identify at least one outlier combination of values of the selected two or more variables comprises program instructions stored on the non-transitory computer-readable medium that are executable by the at least one processor to cause the computing system to:

determine a respective significance value for each given combination of values of the selected two or more variables, wherein the significance value reflects the difference between the number of fault occurrences for the given combination of values of the selected two or more variables and a representative number of fault occurrences; and identify the at least one outlier combination of values of the selected two or more variables based on the respective significance value for each given combination of values of the selected two or more variables.

7. The computing system of claim 6, wherein the representative number of fault occurrences comprises an average of the respective number of fault occurrences for each combination of values of the selected two or more variables.

8. The computing device of claim 1, further comprising program instructions stored on the non-transitory computer-readable medium that are executable by the at least one processor to cause the computing system to:

determine that at least one asset in the population has exhibited a given combination of values of the selected two or more variables without suffering any fault occurrence; and impute a null value for the at least one asset to be used when determining the number of fault occurrences aggregated across the population of assets for the given combination of values of the selected two or more variables.

9. The computing system of claim 1, wherein the visualization pane of the user interface comprises a pivot table view that presents information in a pivot table, wherein the indication of the respective number of fault occurrences aggregated across the population of assets for each combination of values of the selected two or more variables is shown via cells of the pivot table having a vertical axis corresponding to a first selected variable and a horizontal axis corresponding to a second selected variable, and wherein the indication of the identified at least one outlier combination of values of the selected two or more variables is shown via a highlighted bar located within the at least one cell of the pivot table corresponding to the at least one outlier combination.

10. The computing system of claim 1, further comprising program instructions stored on the non-transitory computer-readable medium that are executable by the at least one processor to cause the computing system to:

determine that a given selected variable has a continuous range of possible values;

bin the continuous range of possible values into two or more discrete categories of possible ranges; and use the two or more discrete categories of possible values as the two or more possible values of the given selected variable when determining the respective number of fault occurrences aggregated across the population of assets for each combination of values of the selected two or more variables.

11. A non-transitory computer-readable medium having program instructions stored thereon that are executable to cause a computing device to:

receive, via the network interface from a client station configured with a user interface for use in analyzing fault occurrences across a population of assets, data indicating two or more variables that have been selected by a user via a selection pane of the user interface that includes a variable selection field, wherein the two or more variables each comprise a respective type of asset attribute having a range of possible values;

access data reflecting the respective values of the two or more selected variables at the time of each fault occurrence for the population of assets;

based on the accessed data, determine a respective number of fault occurrences aggregated across the population of assets for each combination of values of the selected two or more variables;

identify at least one outlier combination of values of the selected two or more variables that corresponds to an abnormally large number of fault occurrences relative to the other combinations of values of the selected two or more variables; and transmit, via the network interface to the client station, data that causes the client station to present a visualization pane of the user interface that provides (1) an indication of the respective number of fault occurrences aggregated across the population of assets for each combination of values of the selected two or more variables and (2) an indication of the identified at least one outlier combination of values of the selected two or more variables, wherein the visualization pane of the user interface comprises one or more of a summary table view, a pivot table view, a categorical plot view, a bar chart view, and a density plot view.

12. The non-transitory computer-readable medium of claim 11, wherein the program instructions are further executable by the at least one processor to cause the computing device to:

provide, via the network interface to the client station, data that defines the user interface for use in analyzing fault occurrences across the population of assets.

13. The non-transitory computer-readable medium of claim 11, wherein the program instructions that are executable to cause the computing device to determine the respective number of fault occurrences aggregated across the population of assets for each combination of values of the selected two or more variables comprise program instructions stored on the non-transitory computer-readable medium that are executable by the at least one processor to cause the computing system to, for each given combination of values of the selected two or more variables:

analyze the data reflecting the respective values of each selected two or more variables at the time of each fault occurrence for the population of assets to identify each fault occurrence for which the respective values of each selected two or more variables comprise the given combination of values of the selected two or more variables; and tally the number of identified fault occurrences.

14. The non-transitory computer-readable medium of claim 13, wherein the program instructions that are executable to cause the computing device to determine the respective number of fault occurrences aggregated across the population of assets for each combination of values of the selected two or more variables further comprise program instructions stored on the non-transitory computer-readable medium that are executable by the at least one processor to cause the computing system to, for each given combination of values of the selected two or more variables:

normalize the tallied number of identified fault occurrences based on time value that reflects an amount of time that the assets in the population have been in use.

15. The non-transitory computer-readable medium of claim 11, wherein the program instructions that are executable to cause the computing device to identify at least one outlier combination of values of the selected two or more variables comprises program instructions stored on the non-transitory computer-readable medium that are executable by the at least one processor to cause the computing system to:

determine a respective significance value for each given combination of values of the selected two or more variables, wherein the significance value reflects the difference between the number of fault occurrences for the given combination of values of the selected two or more variables and a representative number of fault occurrences; and identify the at least one outlier combination of values of the selected two or more variables based on the respective significance value for each given combination of values of the selected two or more variables.

16. A computer-implemented method comprising:

receiving, via the network interface from a client station configured with a user interface for use in analyzing fault occurrences across a population of assets, data indicating two or more variables that have been selected by a user via a selection pane of the user interface that includes a variable selection field, wherein the two or more variables each comprise a respective type of asset attribute having a range of possible values;

accessing data reflecting the respective values of the two or more selected variables at the time of each fault occurrence for the population of assets;

based on the accessed data, determining a respective number of fault occurrences aggregated across the population of assets for each combination of values of the selected two or more variables;

identifying at least one outlier combination of values of the selected two or more variables that corresponds to an abnormally large number of fault occurrences relative to the other combinations of values of the selected two or more variables; and transmitting, via the network interface to the client station, data that causes the client station to present a visualization pane of the user interface that provides (1) an indication of the respective number of fault occurrences aggregated across the population of assets for each combination of values of the selected two or more variables and (2) an indication of the identified at least one outlier combination of values of the selected two or more variables, wherein the visualization pane of the user interface comprises one or more of a summary table view, a pivot table view, a categorical plot view, a bar chart view, and a density plot view.

17. The computer-implemented method of claim 16, further comprising:

providing, via the network interface to the client station, data that defines the user interface for use in analyzing fault occurrences across the population of assets.

18. The computer-implemented method of claim 16, wherein determining the respective number of fault occurrences aggregated across the population of assets for each combination of values of the selected two or more variables comprises, for each given combination of values of the selected two or more variables:

analyzing the data reflecting the respective values of each selected two or more variables at the time of each fault occurrence for the population of assets to identify each fault occurrence for which the respective values of each selected two or more variables comprise the given combination of values of the selected two or more variables; and tallying the number of identified fault occurrences.

19. The computer-implemented method of claim 18, wherein determining the respective number of fault occurrences aggregated across the population of assets for each combination of values of the selected two or more variables further comprises, for each given combination of values of the selected two or more variables:

normalizing the tallied number of identified fault occurrences based on time value that reflects an amount of time that the assets in the population have been in use.

20. The computer-implemented method of claim 16, wherein identifying at least one outlier combination of values of the selected two or more variables comprises:

determining a respective significance value for each given combination of values of the selected two or more variables, wherein the significance value reflects the difference between the number of fault occurrences for the given combination of values of the selected two or more variables and a representative number of fault occurrences; and identifying the at least one outlier combination of values of the selected two or more variables based on the respective significance value for each given combination of values of the selected two or more variables.

* * * * *